US009936802B1

(12) United States Patent
Newhouse

(10) Patent No.: US 9,936,802 B1
(45) Date of Patent: Apr. 10, 2018

(54) HEIGHT ADJUSTABLE TABLE

(71) Applicant: BAKER MANUFACTURING COMPANY, INC., Pineville, LA (US)

(72) Inventor: Thomas J. Newhouse, Grand Rapids, MI (US)

(73) Assignee: BAKER MANUFACTURING COMPANY, INC., Pineville, LA (US)

( * ) Notice: Subject to any disclaimer, the term of this patent is extended or adjusted under 35 U.S.C. 154(b) by 0 days.

(21) Appl. No.: 15/082,837

(22) Filed: Mar. 28, 2016

Related U.S. Application Data

(60) Provisional application No. 62/235,915, filed on Oct. 1, 2015, provisional application No. 62/240,427, filed on Oct. 12, 2015.

(51) Int. Cl.
| | |
|---|---|
| *A47B 9/20* | (2006.01) |
| *A47B 21/06* | (2006.01) |
| *A47B 21/02* | (2006.01) |
| *A47B 83/04* | (2006.01) |
| *F16L 3/01* | (2006.01) |
| *A47B 81/00* | (2006.01) |

(52) U.S. Cl.
CPC .............. *A47B 21/06* (2013.01); *A47B 9/20* (2013.01); *A47B 21/02* (2013.01); *A47B 81/00* (2013.01); *A47B 83/045* (2013.01); *F16L 3/01* (2013.01); *A47B 2021/062* (2013.01); *A47B 2021/066* (2013.01)

(58) Field of Classification Search
CPC ........... A47B 9/20; A47B 21/02; A47B 21/06; A47B 81/00; A47B 83/045; F16L 3/01
USPC ......... 312/194, 195, 196, 107, 223.3, 223.6, 312/306, 312; 108/50.01, 50.02, 147; 174/135
See application file for complete search history.

(56) References Cited

U.S. PATENT DOCUMENTS

| | | | |
|---|---|---|---|
| 3,080,835 A | | 3/1963 | Vito et al. |
| 3,606,450 A | | 9/1971 | Sedgwick et al. |
| 3,770,334 A | * | 11/1973 | Weber ............... A47B 9/10 312/194 |
| 3,820,176 A | | 6/1974 | Feiertag |
| 4,094,561 A | * | 6/1978 | Wolff ............... A47B 21/06 138/106 |
| 4,139,175 A | | 2/1979 | Bauer |
| 4,515,087 A | | 5/1985 | Kurrasch |
| 4,570,547 A | | 2/1986 | Colby |
| 4,615,279 A | | 10/1986 | de la Haye |
| 4,714,028 A | | 12/1987 | Uredat-Neuhoff |

(Continued)

*Primary Examiner* — James O Hansen
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A height adjustable desk or table is disclosed wherein a specially configured base includes a middle cabinet having an interior and side cabinets that protrude forwardly from the middle cabinet. An elevating desk top or panel is movable between elevated and lowered positions. A specially configured cable group or assembly or sleeve containing cables extends out from the middle cabinet interior and through a laterally extending slot (e.g., oval) or opening as the desk top or panel elevates. The cables can include power cables and data cables. In one embodiment, the specially configured sleeve is of flexible or fabric or woven material. In one embodiment, the sleeve has two bores that separate one type of cable from another type of cable.

14 Claims, 28 Drawing Sheets

(56) References Cited

U.S. PATENT DOCUMENTS

| | | | | |
|---|---|---|---|---|
| 5,024,167 A | * | 6/1991 | Hayward | A47B 17/003 108/50.02 |
| 5,340,326 A | * | 8/1994 | LeMaster | H01R 25/00 439/207 |
| 5,437,235 A | * | 8/1995 | Randolph | A47B 21/00 108/25 |
| 5,495,811 A | | 3/1996 | Carson et al. | |
| 5,562,052 A | | 10/1996 | Glashouwer et al. | |
| 5,669,312 A | | 9/1997 | Norton | |
| 5,845,587 A | * | 12/1998 | Ditonto | A47B 21/00 108/147 |
| 5,845,590 A | | 12/1998 | Seidl | |
| 5,890,438 A | | 4/1999 | Frankish | |
| 6,131,870 A | | 10/2000 | Tseng | |
| 6,148,741 A | | 11/2000 | Motta | |
| 6,182,583 B1 | | 2/2001 | Larson | |
| 6,224,155 B1 | | 5/2001 | DeKraker et al. | |
| 6,289,825 B1 | | 9/2001 | Long | |
| 6,360,675 B1 | * | 3/2002 | Jones | A47B 21/06 108/50.02 |
| 6,435,112 B1 | | 8/2002 | Insalaco | |
| 6,474,246 B2 | | 11/2002 | Hsu | |
| 6,494,005 B2 | | 12/2002 | Zimmerman | |
| 6,510,803 B1 | | 1/2003 | Agee | |
| 6,546,880 B2 | | 4/2003 | Agee | |
| 6,550,728 B1 | | 4/2003 | Fuhrman | |
| 6,598,841 B2 | | 7/2003 | Erickson et al. | |
| 6,935,250 B1 | | 8/2005 | Arnold | |
| 6,960,098 B1 | * | 11/2005 | Tseng | A47B 21/06 108/50.02 |
| 7,077,068 B1 | | 7/2006 | Agee | |
| 7,438,964 B2 | * | 10/2008 | Clark | H02G 3/0481 138/123 |
| 7,640,866 B1 | * | 1/2010 | Schermerhorn | A47B 21/00 108/5 |
| 7,807,928 B1 | * | 10/2010 | Tate | H02G 3/0487 174/110 R |
| 7,908,981 B2 | | 3/2011 | Agee | |
| 8,360,536 B2 | * | 1/2013 | Garg | H02G 3/0481 108/50.02 |
| 2005/0046315 A1 | * | 3/2005 | Doane | A47B 17/02 312/196 |
| 2015/0171611 A1 | * | 6/2015 | Ho | H02G 11/00 24/115 A |
| 2015/0311685 A1 | * | 10/2015 | Murray | H02G 3/0487 174/68.3 |

\* cited by examiner

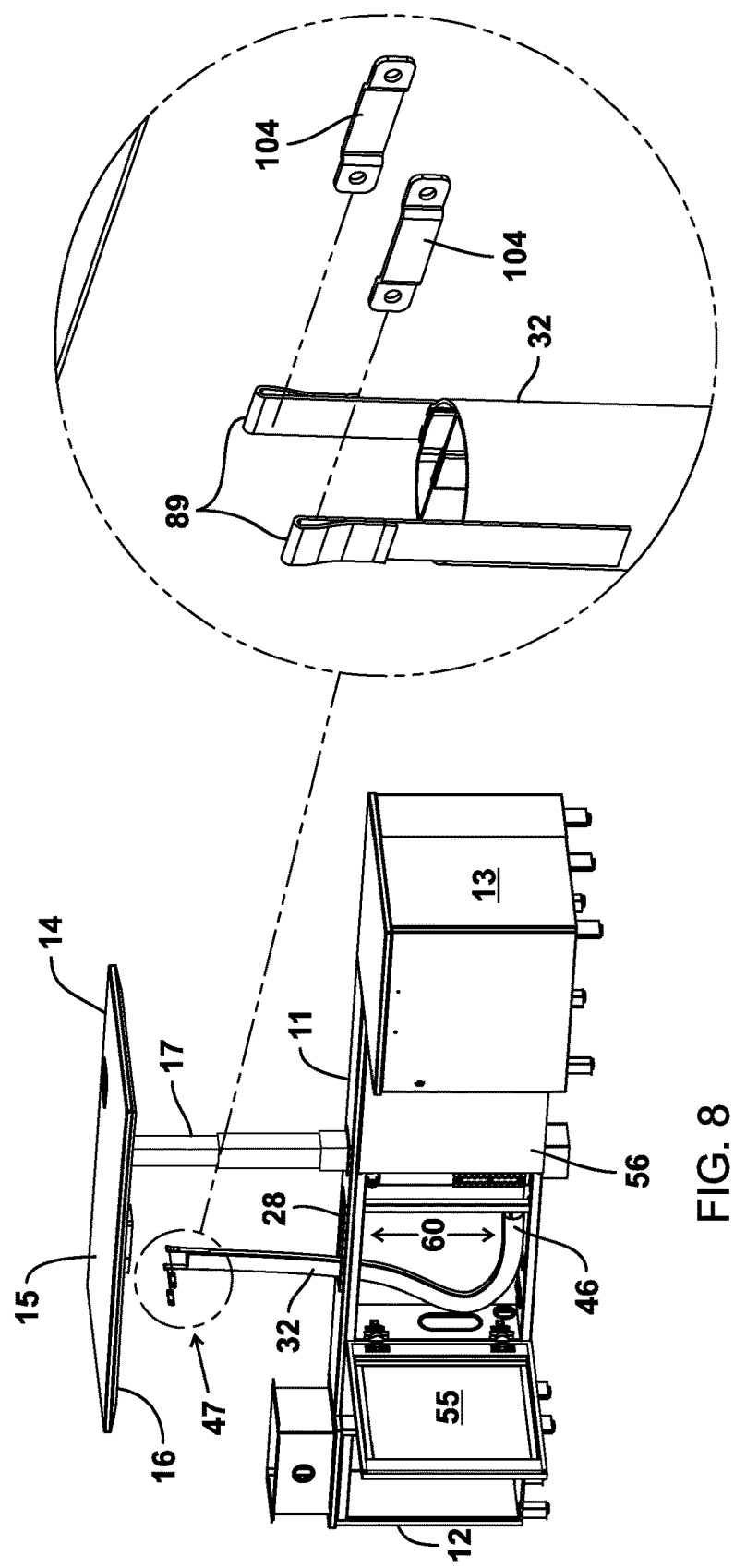

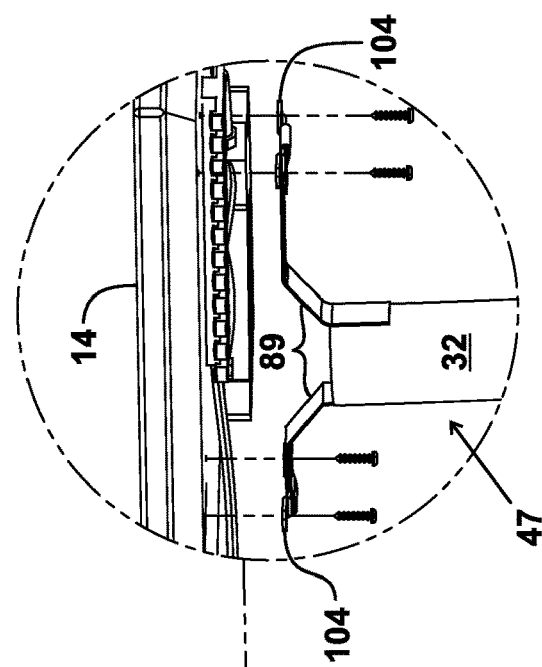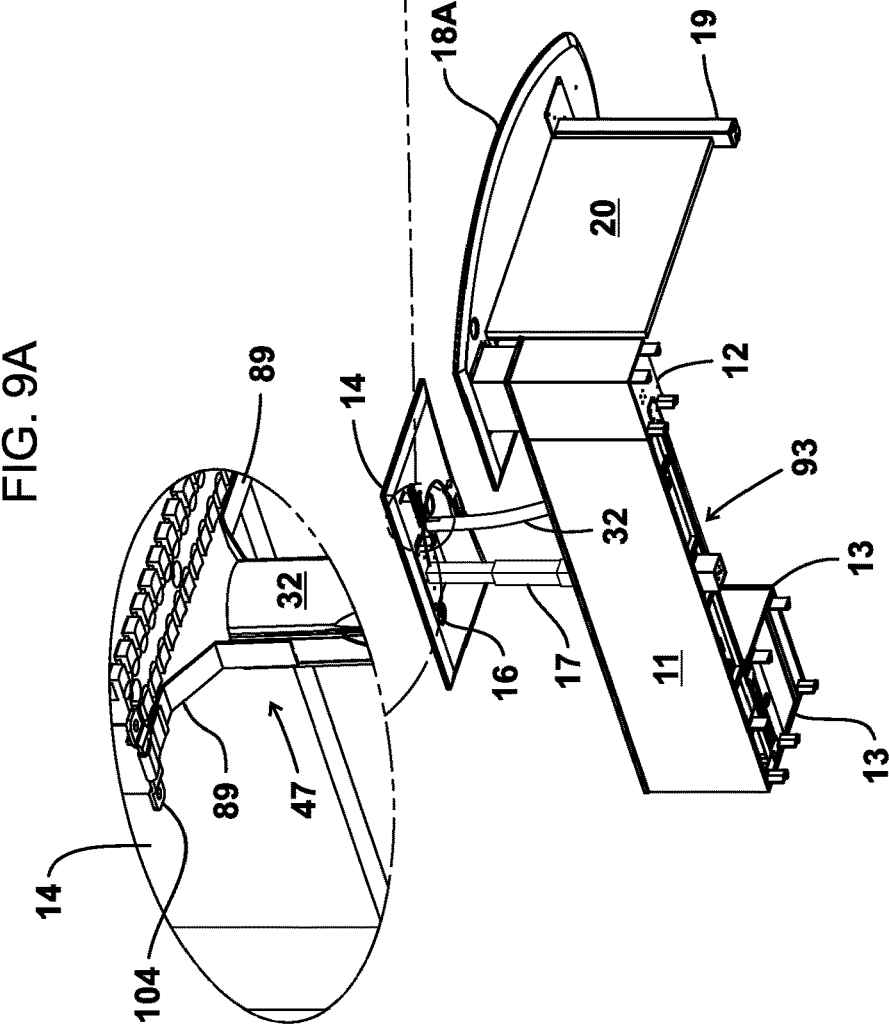

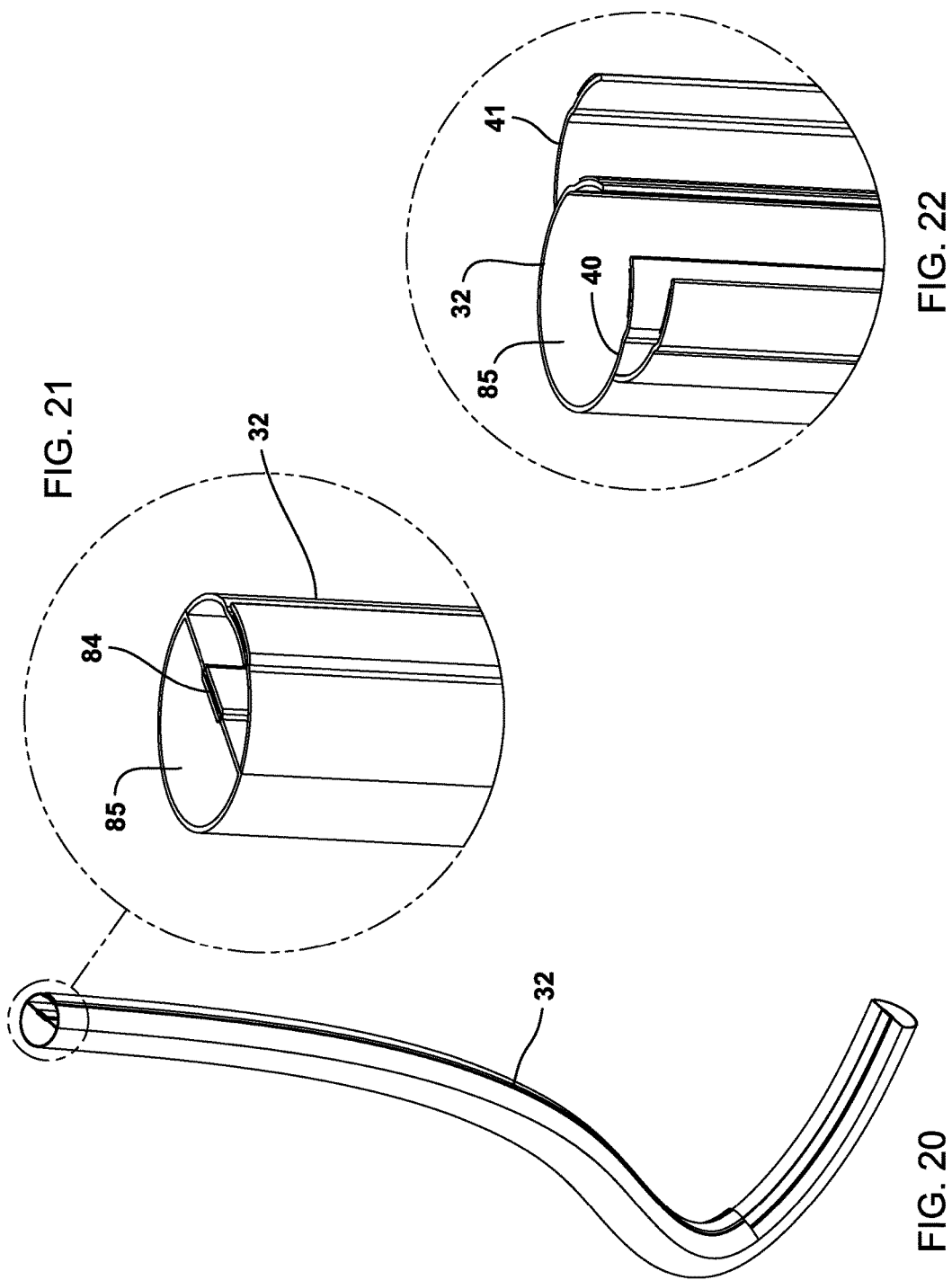

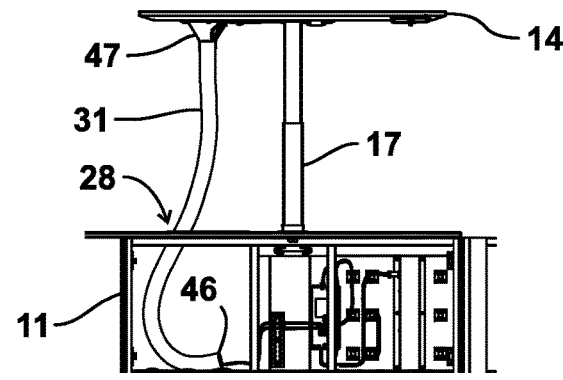
FIG. 31A
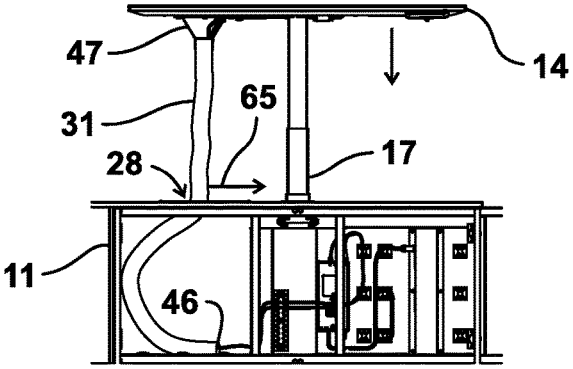
FIG. 31B
FIG. 31C
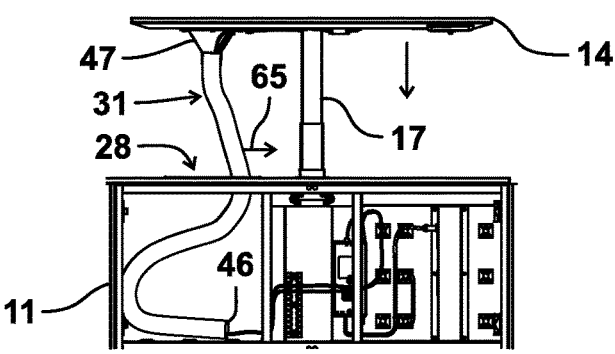
FIG. 31D
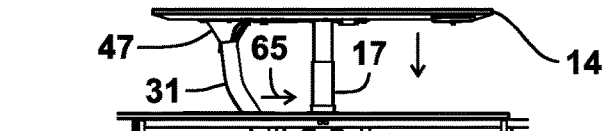
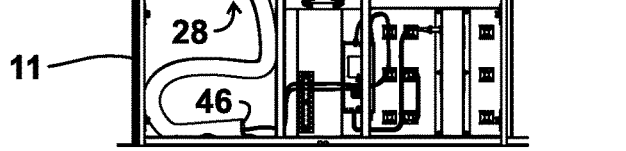
FIG. 31E
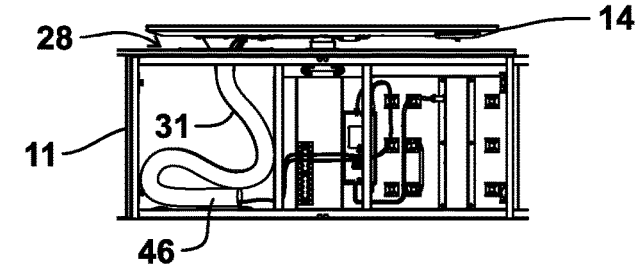
FIG. 31F

HEIGHT ADJUSTABLE TABLE

CROSS-REFERENCE TO RELATED APPLICATIONS

Priority of U.S. Provisional Patent Application Ser. No. 62/235,915, filed 1 Oct. 2015 and U.S. Provisional Patent Application Ser. No. 62/240,427, filed 12 Oct. 2015, each of which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to height adjustable tables. More particularly, the present invention relates to an improved height adjustable table that includes specially configured cabinets or sections, one or more that house both electrical power and data components. A bundle or sleeve arrangement supports and contains multiple cables (e.g., for a computer or telephone). A desk top or work surface is movable between elevated and lowered positions. The cable bundle or sleeve travels laterally in a provided slot as the desk top is raised and lowered.

2. General Background of the Invention

Height adjustable tables enable different users to comfortably use the table notwithstanding differences in height. Additionally, height adjustable tables enable a user to vary the elevation of the table depending upon the activity being conducted. For example, a user might choose a first elevation of a table top when operating a computer. That person might set the table at a different height or elevation when reading a book.

Some height adjustable tables have been patented. The following table lists patents that have issued and that relate at least generally to height adjustable tables. The order of listing is of no relevance.

TABLE

| PAT. NO. | TITLE | ISSUE DATE |
| --- | --- | --- |
| 3,080,835 | Hydraulically Operated Over-Bed Table | Mar. 12, 1963 |
| 3,606,450 | Wheelchair Table-Desk | Sep. 20, 1971 |
| 3,820,176 | Patient Handling Table | Jun. 28, 1974 |
| 4,139,175 | Height-Adjustable Chair or Table Pedestal | Feb. 13, 1979 |
| 4,515,087 | Height Adjustable Table | May. 7, 1985 |
| 4,570,547 | Table With Adjustable Height Mechanism | Feb. 18, 1986 |
| 4,615,279 | Vertically Adjustable Table | Oct. 7, 1986 |
| 4,714,028 | Height Adjustable Table | Dec. 22, 1987 |
| 5,495,811 | Height Adjustable Table | Mar. 5, 1996 |
| 5,562,052 | Height-adjustable Table | Oct. 8, 1996 |
| 5,669,312 | Bar Rail Comfort Tray | Sep. 23, 1997 |
| 5,845,590 | Adjustable Height Table | Dec. 8, 1998 |
| 5,890,438 | Height Adjustment System for a Desk or Workstation | Apr. 6, 1999 |
| 6,131,870 | Height Adjusting Apparatus with Intermeshing Bevel Gears | Oct. 17, 2000 |

TABLE-continued

| PAT. NO. | TITLE | ISSUE DATE |
| --- | --- | --- |
| 6,148,741 | Table with Adjustable Table Top Portions | Nov. 21, 2000 |
| 6,182,583 | Height Adjustable Pedestal for Chairs and Tables | Feb. 6, 2001 |
| 6,224,155 | Vertical Height Adjustment Mechanism for Chairs | May. 1, 2001 |
| 6,289,825 | Adjustment Mechanism for Workstation | Sep. 18, 2001 |
| 6,435,112 | Height Adjustable Table | Aug. 20, 2002 |
| 6,474,246 | Table with Extendable Legs | Nov. 5, 2002 |
| 6,494,005 | Telescopic Linear Actuator | Dec. 17, 2002 |
| 6,510,803 | Height Adjustable Table | Jan. 28, 2003 |
| 6,546,880 | Height Adjustable Table | Apr. 15, 2003 |
| 6,550,728 | Height Adjustable Table | Apr. 22, 2003 |
| 6,598,841 | Height Adjustable Table Leg | Jul. 29, 2003 |
| 6,935,250 | Adjustable Height Table With Multiple Legs Operable By a Single Crank | Aug. 30, 2005 |
| 7,077,068 | Height Adjustable Table | Jul. 18, 2006 |
| 7,908,981 | Height Adjustable Table | Mar. 22, 2011 |

BRIEF SUMMARY OF THE INVENTION

The present invention provides an improved height adjustable table. The present invention provides an elevating desk apparatus having a base that includes a middle cabinet having a cabinet interior, left and right side portions and a middle cabinet top with an upper surface.

A telescoping member can be supported by the base.

A right side cabinet section can be attached to the right side of the middle cabinet.

A left side cabinet section can be attached to the left side of the middle cabinet.

A movable desk top having a work surface can be mounted on the telescoping member.

An elongated slot or opening can be provided in the base at the middle cabinet and extending through the top, the slot having first and second slot end portions.

A cable assembly, cable group or cable bundle preferably extends between the cabinet interior and the movable desk.

The cable assembly preferably moves laterally between the slot end portions when the movable desk top moves between an upper or elevated position and a lower position that is below the upper or elevated position.

In one embodiment, the cable assembly preferably includes multiple cables contained within a cable sleeve.

In one embodiment, the sleeve preferably has two bores separated by a dividing panel or wall.

In one embodiment, the cable assembly preferably includes a power cable or cables and a data cable or cables.

In one embodiment, the power cable or cables preferably occupy one said bore and the data cable or cables preferably occupy the other said bore.

In one embodiment, the sleeve preferably includes knitted material.

In one embodiment, the sleeve preferably includes flexible material.

In one embodiment, the sleeve preferably includes fabric material.

In one embodiment, the sleeve preferably includes a pair of connectable flaps that can be opened and closed to form one of said bores.

In one embodiment, the sleeve preferably includes two pairs of connectable flaps, wherein each pair of flaps can be opened and closed to form a said bore.

In one embodiment, one pair of flaps extends a first distance and the other pair of flaps extends a second distance that is longer than said first distance.

In one embodiment, fasteners enable the flaps to be closed and opened.

In various embodiments the height adjustable table enables a user to vary the elevation of a table depending upon the activity being conducted, the height of the user, or depending on whether the user wishes to sit or stand, for example.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 8-8A are partial perspective views of a preferred embodiment of the apparatus of the present invention;

FIGS. 9-9B are partial perspective views of a preferred embodiment of the apparatus of the present invention;

FIGS. 20-30 are fragmentary views of a preferred embodiment of the apparatus of the present invention showing the cable sleeve;

FIGS. 31A-31F are perspective views of a preferred embodiment of the apparatus of the present invention showing sleeve positions as the desk top is raised and lowered.

DETAILED DESCRIPTION OF THE INVENTION

Figure 1:
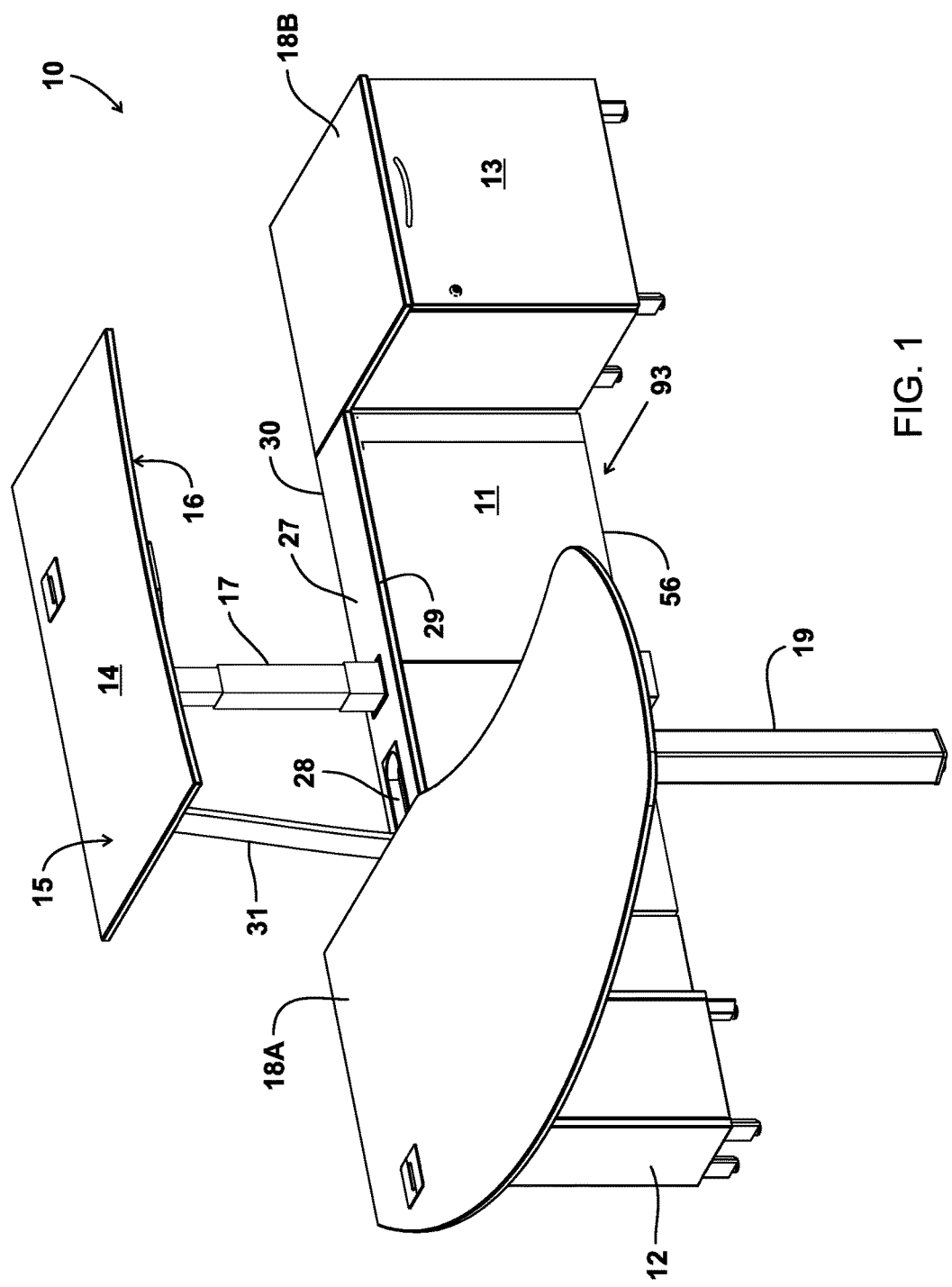
FIG. 1 is a perspective view of a preferred embodiment of the apparatus of the present invention.
Figure 2:
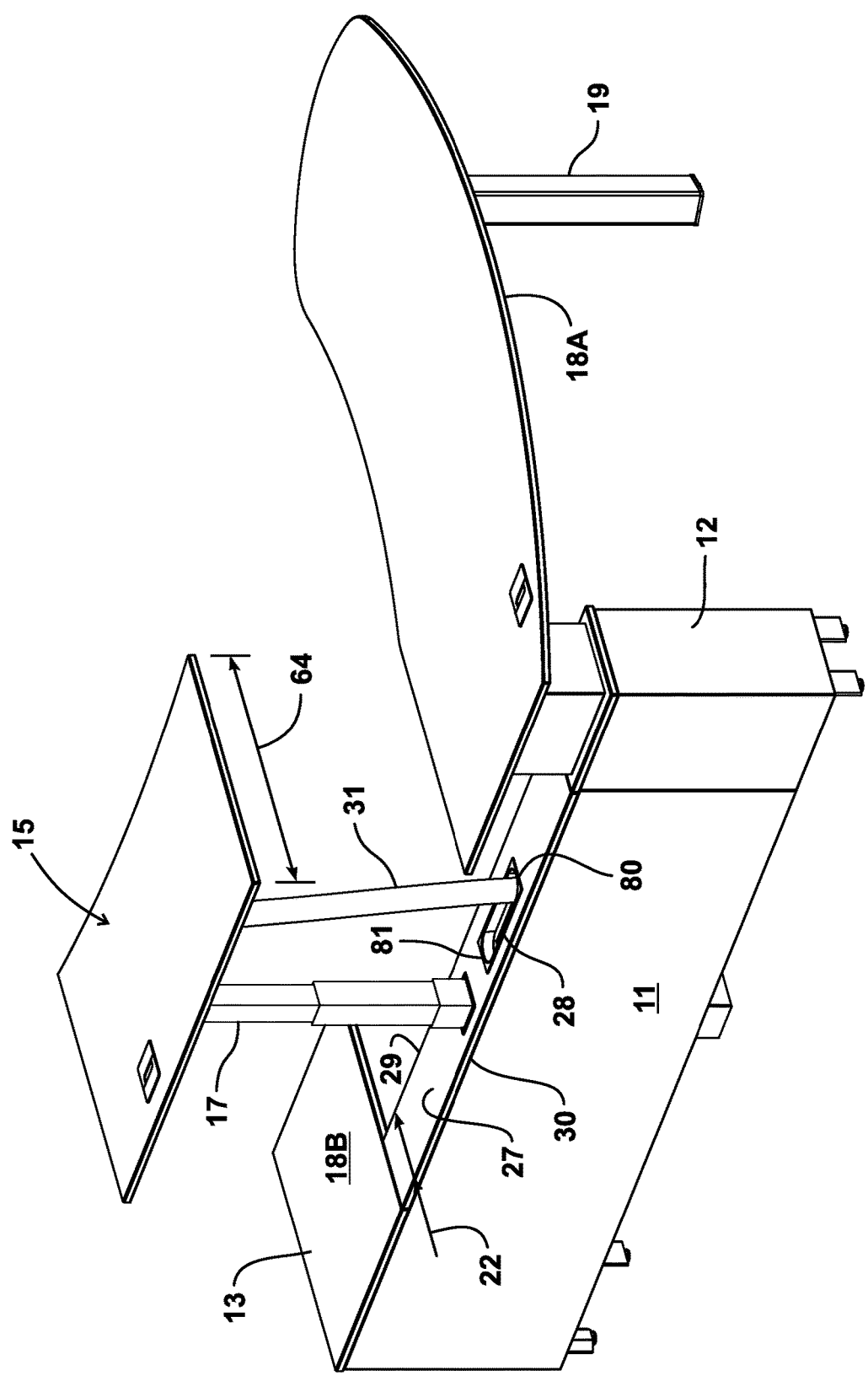
FIG. 2 is a perspective view of a preferred embodiment of the apparatus of the present invention.
Figure 13:
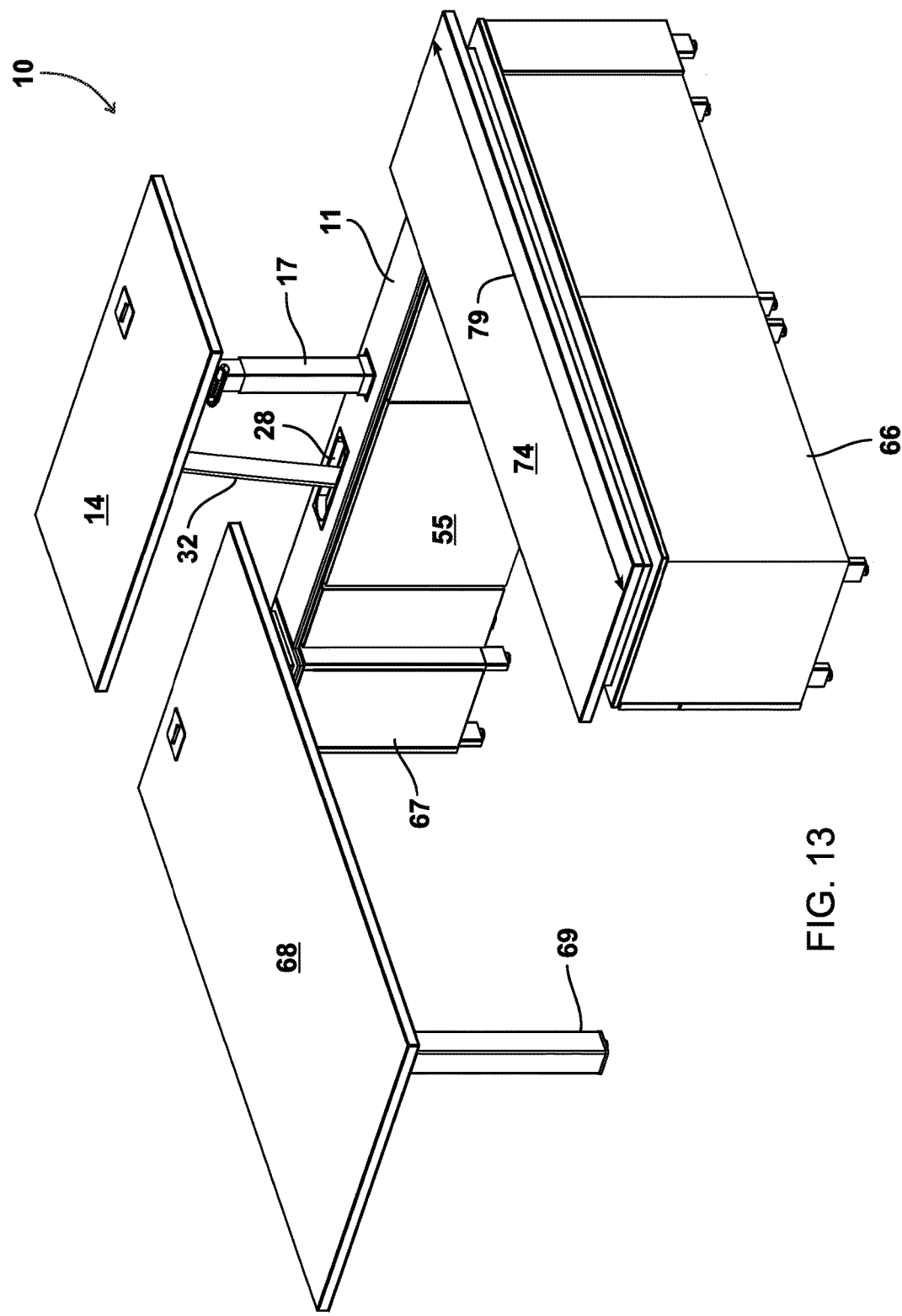
FIGS. 13 and 14 are perspective views of a preferred embodiment of the apparatus of the present invention shown with a larger, longer right side cabinet.
Figure 14:
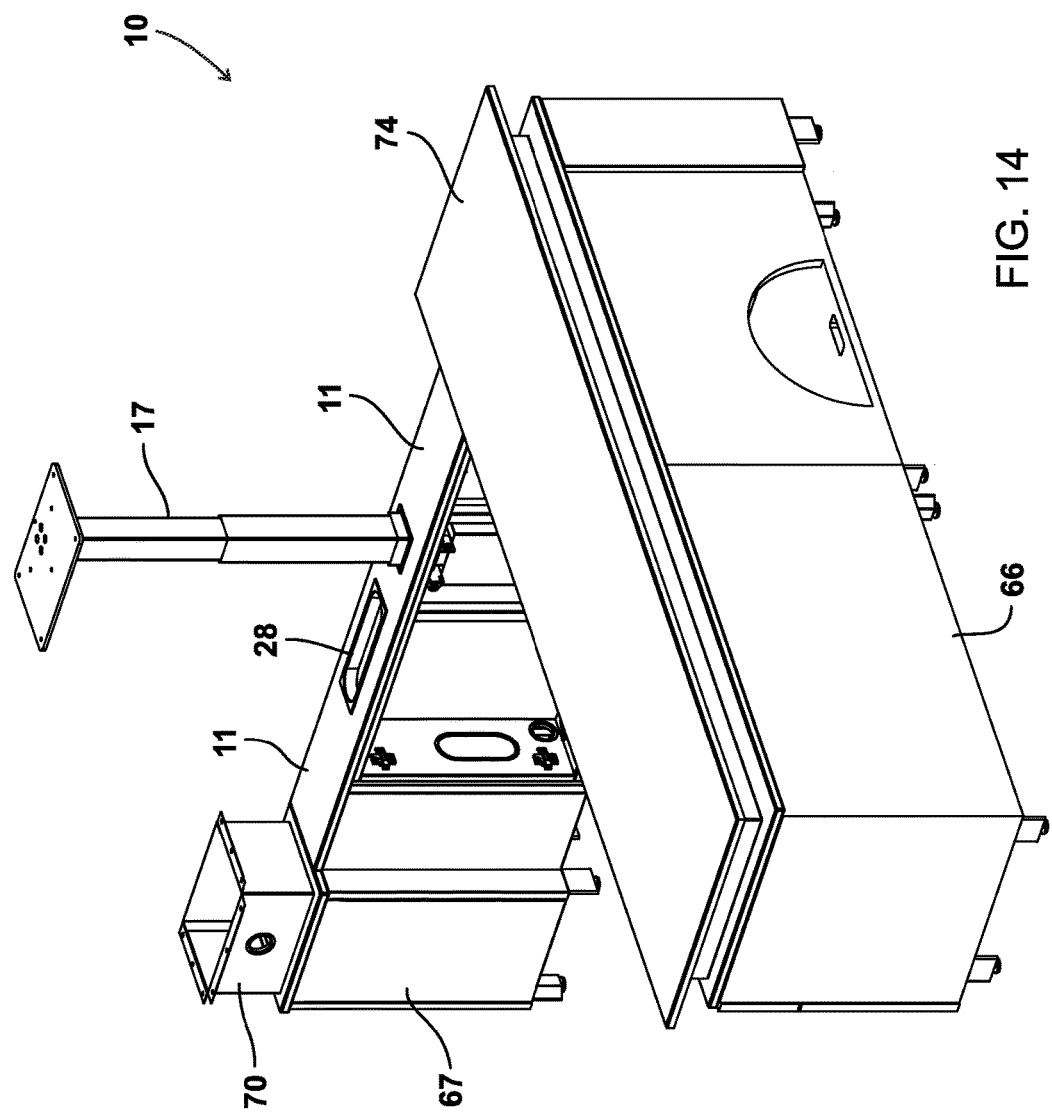

FIGS. 1-14 show a first embodiment of the apparatus of the present invention, designated generally by the numeral 10. Height adjustable desk or elevating desk apparatus 10 provides a plurality of cabinets or sections connected together. The sections or cabinets preferably include a central or middle cabinet or section 11, a left side section or cabinet 12 and a right side section or cabinet 13. FIGS. 13 and 14 illustrate an alternative first embodiment wherein right section or cabinet 66 and table or desk top 74, which preferably is a fixed table or desk top, are longer than cabinet 13 and desk top 18B in FIG. 1, and extend farther from middle or central section 11. Referring to FIGS. 1-2, the left side section or cabinet 12 preferably attaches (e.g., bolted connection or other fastener(s)) to the left side of the middle or central section or cabinet 11. The right side section or cabinet 13 preferably attaches (e.g., bolted or interlocking connection or using other fastener(s) or connector(s)) to the right side of the middle or central cabinet or section 11. Central cabinet 11 can have doors or entry panels 55, 56 and interior 60 (see FIG. 8).

Figure 7:
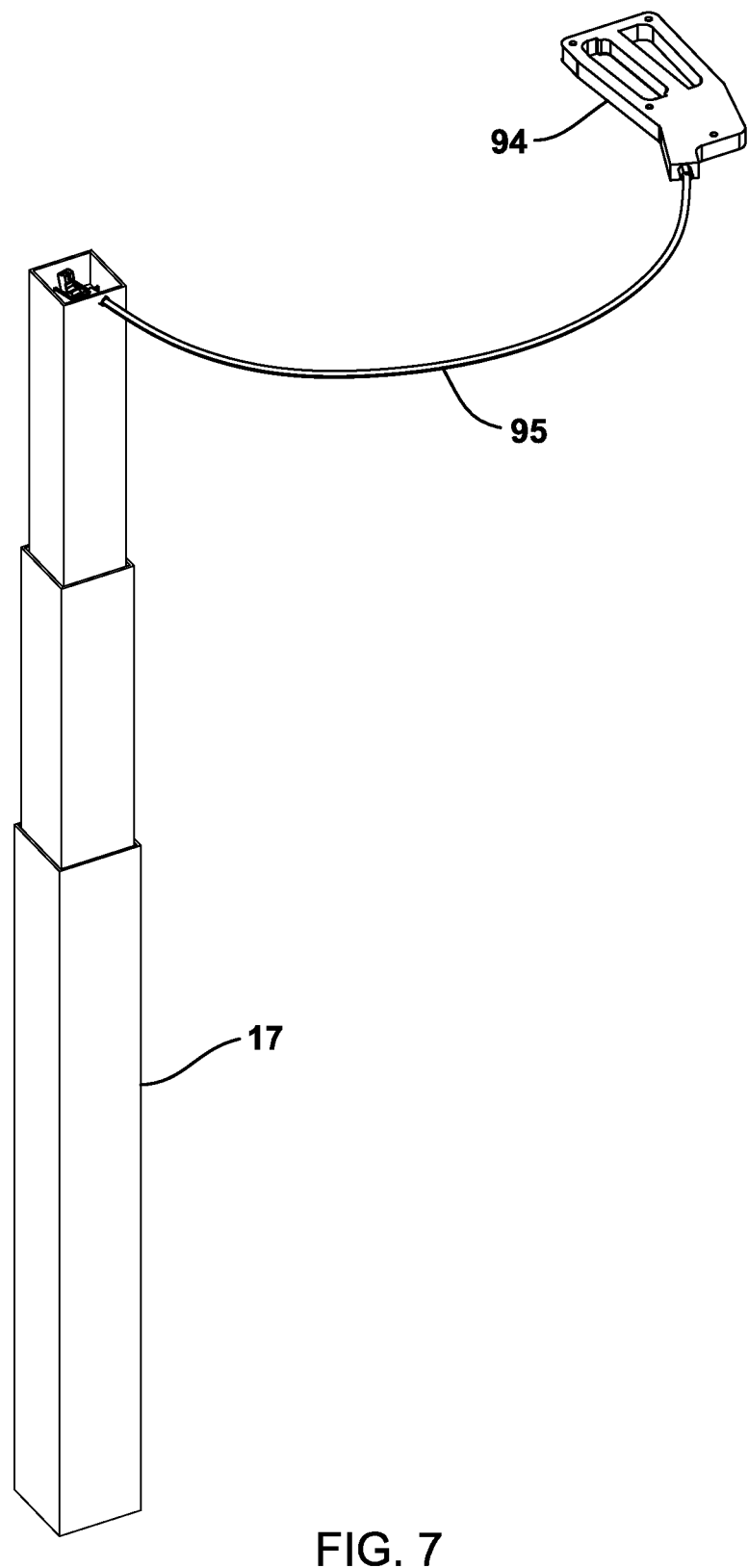
FIG. 7 is a partial perspective view of a preferred embodiment of the apparatus of the present invention.

An elevating desk section or top section 14 is preferably movable between elevated and lowered positions. Desk top or desk section 14 preferably provides an upper surface or work surface 15 and underside or lower surface 16. Work surface 15 enables placement thereon of selected items, such as computer, monitor, laptop computer, calculator, tablet (e.g., an android tablet or an IPad® device) or telephone or other electrical device or selected object. A telescoping support or extensible leg 17 is preferably mounted to middle or central cabinet 11. Telescoping support 17 can be mounted to middle or central cabinet 11 by screws or other fasteners or connectors, for example. Telescoping support 17 preferably is 2.75 square inches. In one embodiment of the present invention, telescoping support 17 is preferably made out of steel. Telescoping support 17 may also comprise other metal, plastic or synthetic materials. An upper end of support or leg 17 preferably supports desk top/desk section 14. Telescoping support/leg/column 17 enables desk top/desk section 14 to be elevated or lowered. The support/leg 17 can be powered by an electric motor, spring, pneumatic actuator or hydraulic actuator. Such a telescoping leg or support can be seen for example in one or more of the following U.S. Pat. Nos. 3,080,835, 3,606,450, 3,820,176, 4,139,175, 4,515,087, 4,570,547, 4,615,279, 4,714,028, 5,495,811, 5,562,052, 5,669,312, 5,845,590, 5,890,438, 6,131,870, 6,148,741, 6,182,583, 6,224,155, 6,289,825, 6,435,112, 6,474,246, 6,494,005, 6,510,803, 6,546,880, 6,550,728, 6,598,841, 6,935,250, 7,077,068, and 7,908,981, each patent hereby incorporated herein by reference. In FIG. 7, leg 17 (if pneumatic) illustrates a release handle 94 and release cable or conduit 95, wherein said release handle 94 lowers leg or support or column 17 when depressed.

Either or both of left side cabinet/section 12 and right side cabinet/section 13 can be provided with a fixed (non-elevating) desk top 18A, 18B. Panel 20 (e.g., fixed panel) can be mounted below fixed top 18A and spanning between leg 19 and left cabinet 12 (see FIG. 9). Other legs or supports or columns 19, can be provided and aid in supporting fixed desk top 18A.

Middle section or cabinet 11 has a height (see arrow 21 in FIG. 4) and a depth (see arrow 22 in FIG. 2). Left side section 12 has a height (arrow 23) and a depth (arrow 24) (see FIG. 5). Right side section 13 has a height (arrow 25) and a depth (arrow 26) (see FIG. 5). Notice that the depth (arrow 22) of middle section 11 can be smaller than the depth 24 or 26 of one or both of side sections/cabinets 12, 13 (see FIGS. 2-6).

Elevating desk top 14 has a depth (arrow 64) that is preferably greater than the depth (arrow 22) of the middle section or cabinet 11 (see FIG. 2). A knee space area 93 is thus preferably provided in between left and right side sections/cabinets 12, 13, in front of middle section or cabinet 11, under part of desk top 14 and in between desk tops 18A, 18B. The side sections/cabinets 12, 13 preferably provide support and stability to the middle section/cabinet 11 so that it does not fall over, even when elevating desk top 14 supports one or more heavy components or articles such as a computer and/or computer monitor.

Figure 3:
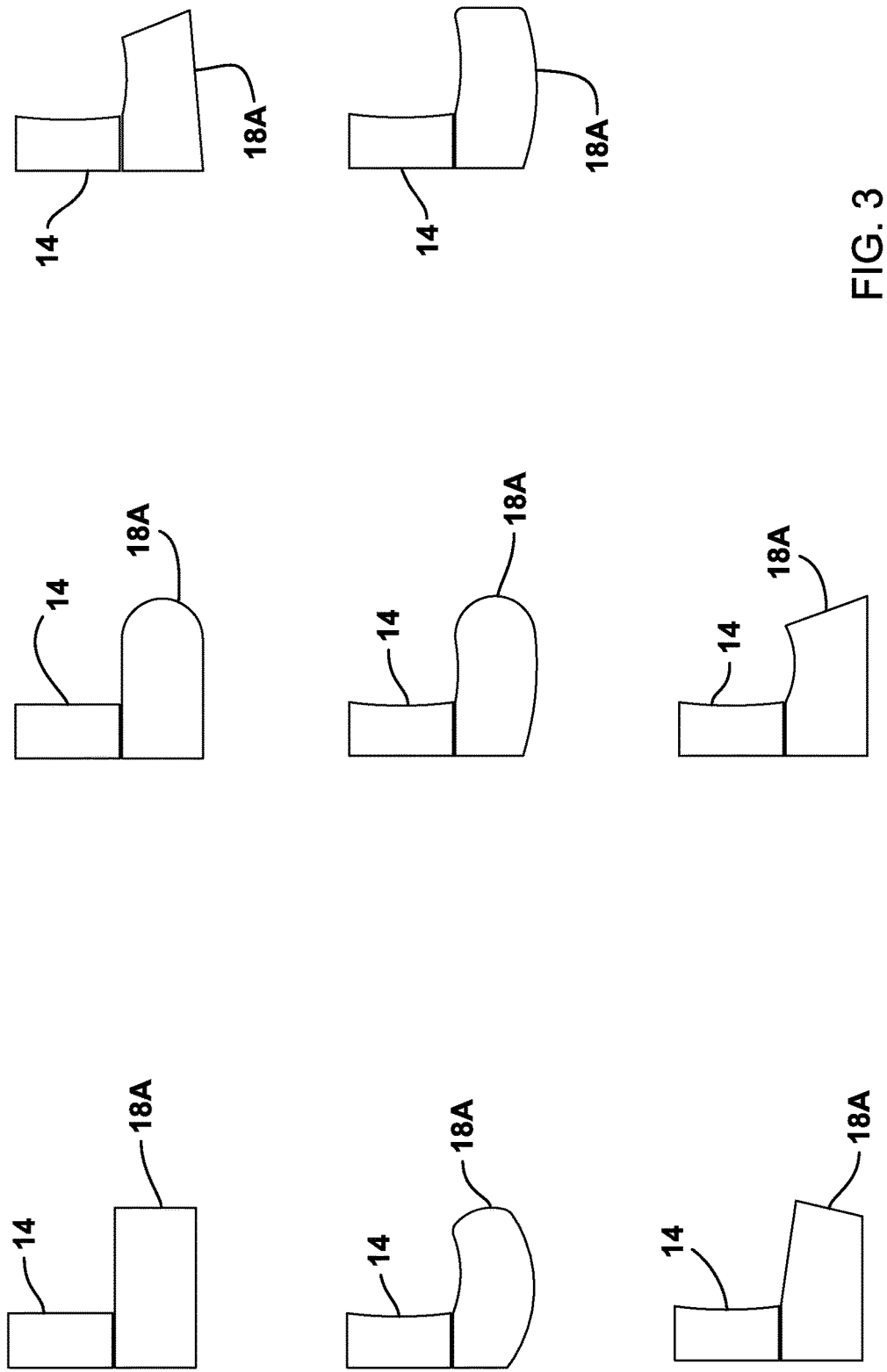
FIG. 3 is a partial plan view of a preferred embodiment of the apparatus of the present invention showing various optional table top configurations.
Figure 4:
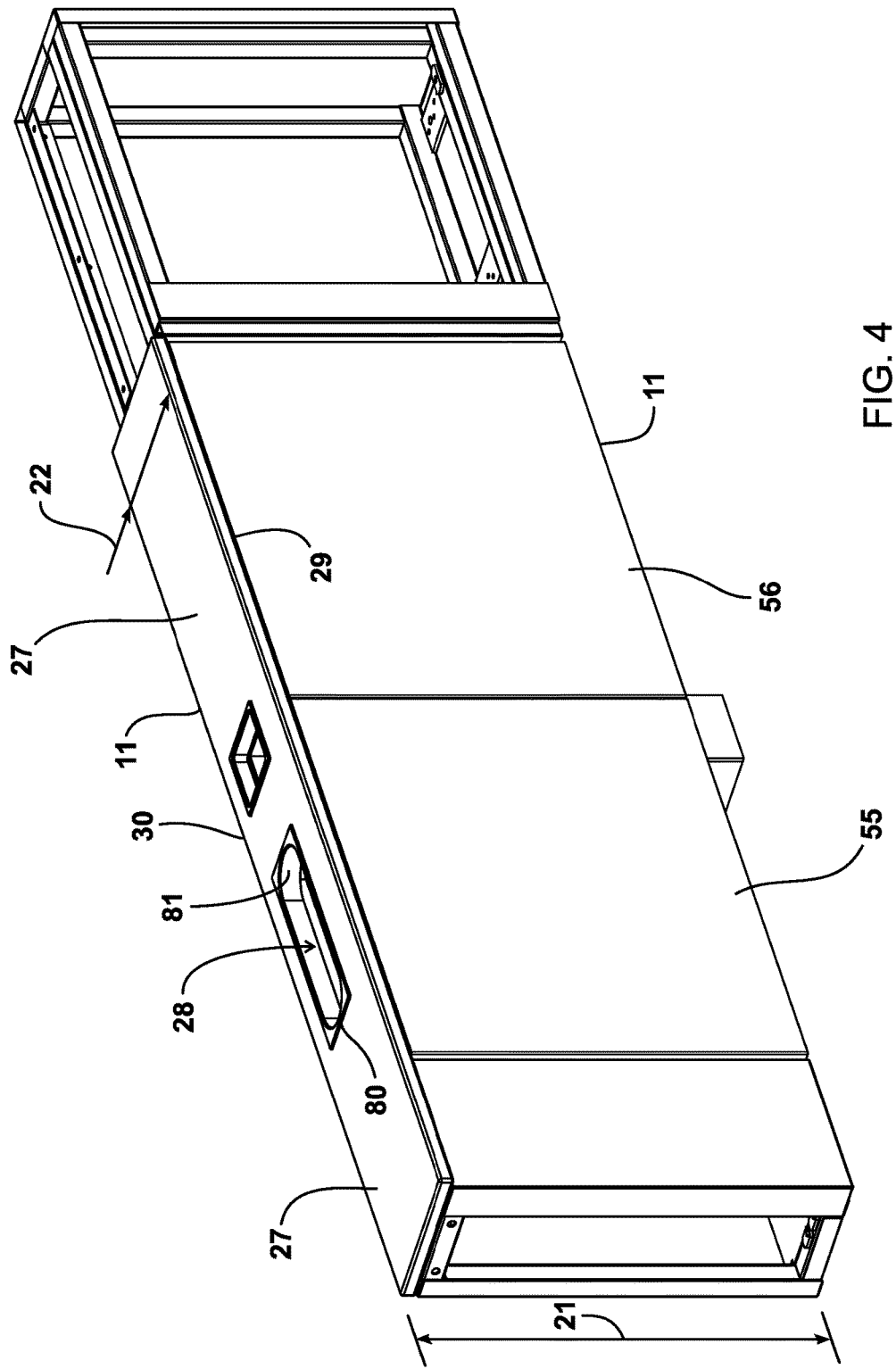
FIG. 4 is a partial perspective view of a preferred embodiment of the apparatus of the present invention.
Figure 5:
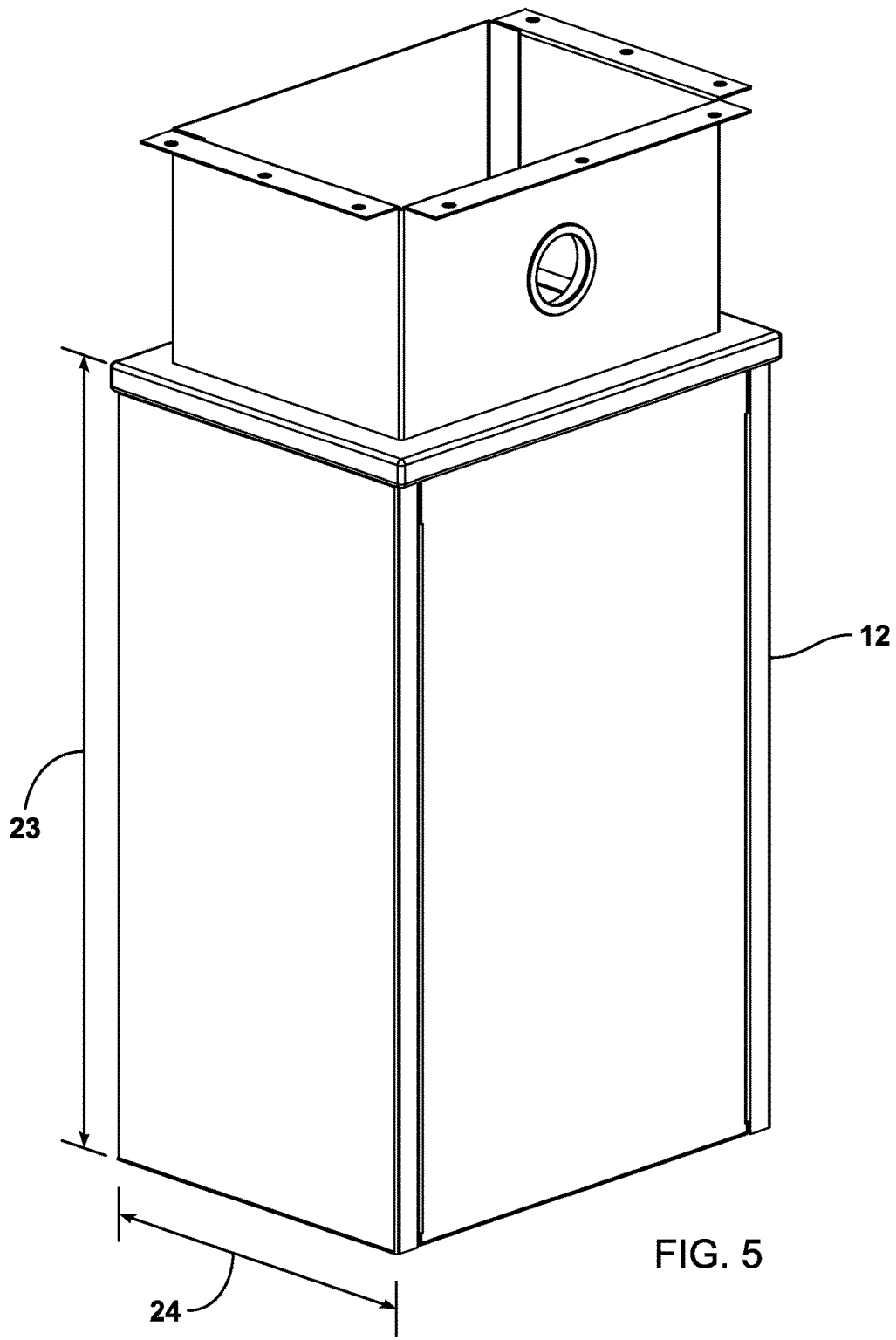
FIG. 5 is a partial perspective view of a preferred embodiment of the apparatus of the present invention.
Figure 6:
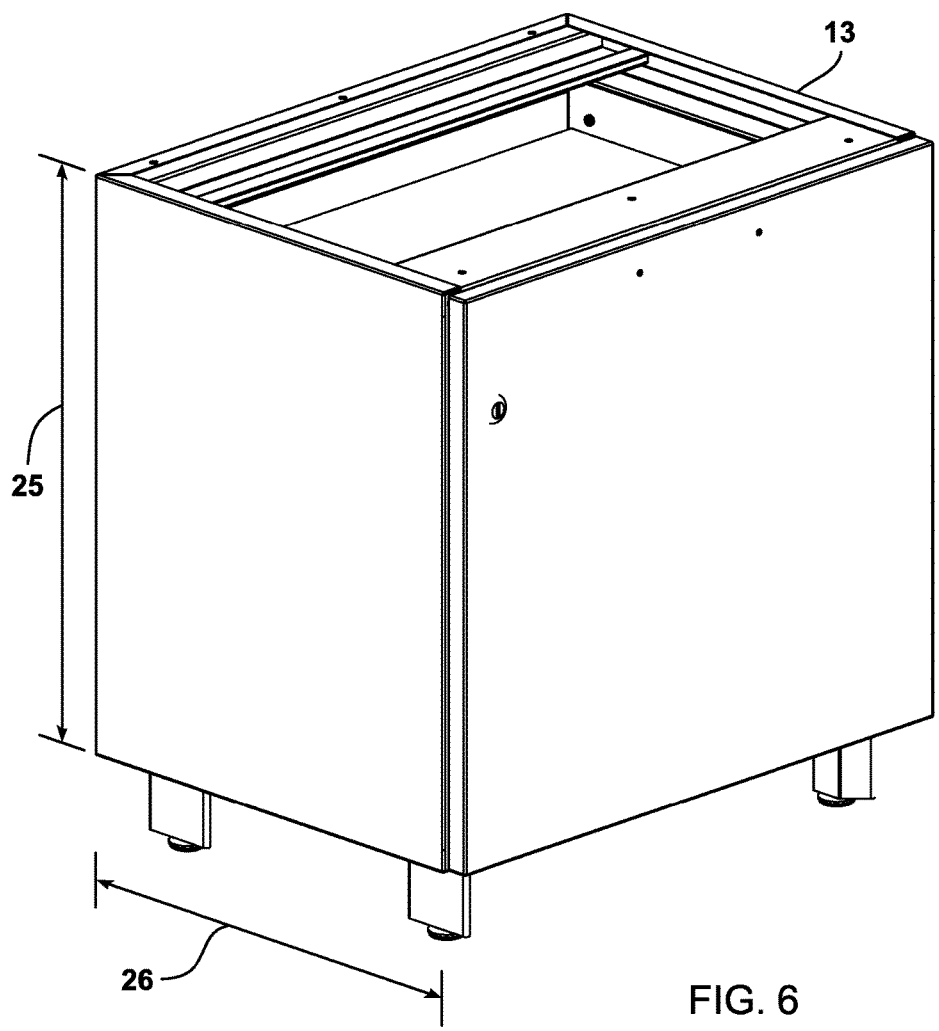
FIG. 6 is a partial perspective view of a preferred embodiment of the apparatus of the present invention.

FIG. 3 illustrates optional table top configurations, illustrating elevating desk top 14 and a table or desk top 18A. Desk top 18B, 68 or 74 can also comprise various configurations, for example configurations as illustrated in FIG. 3.

Figure 10:
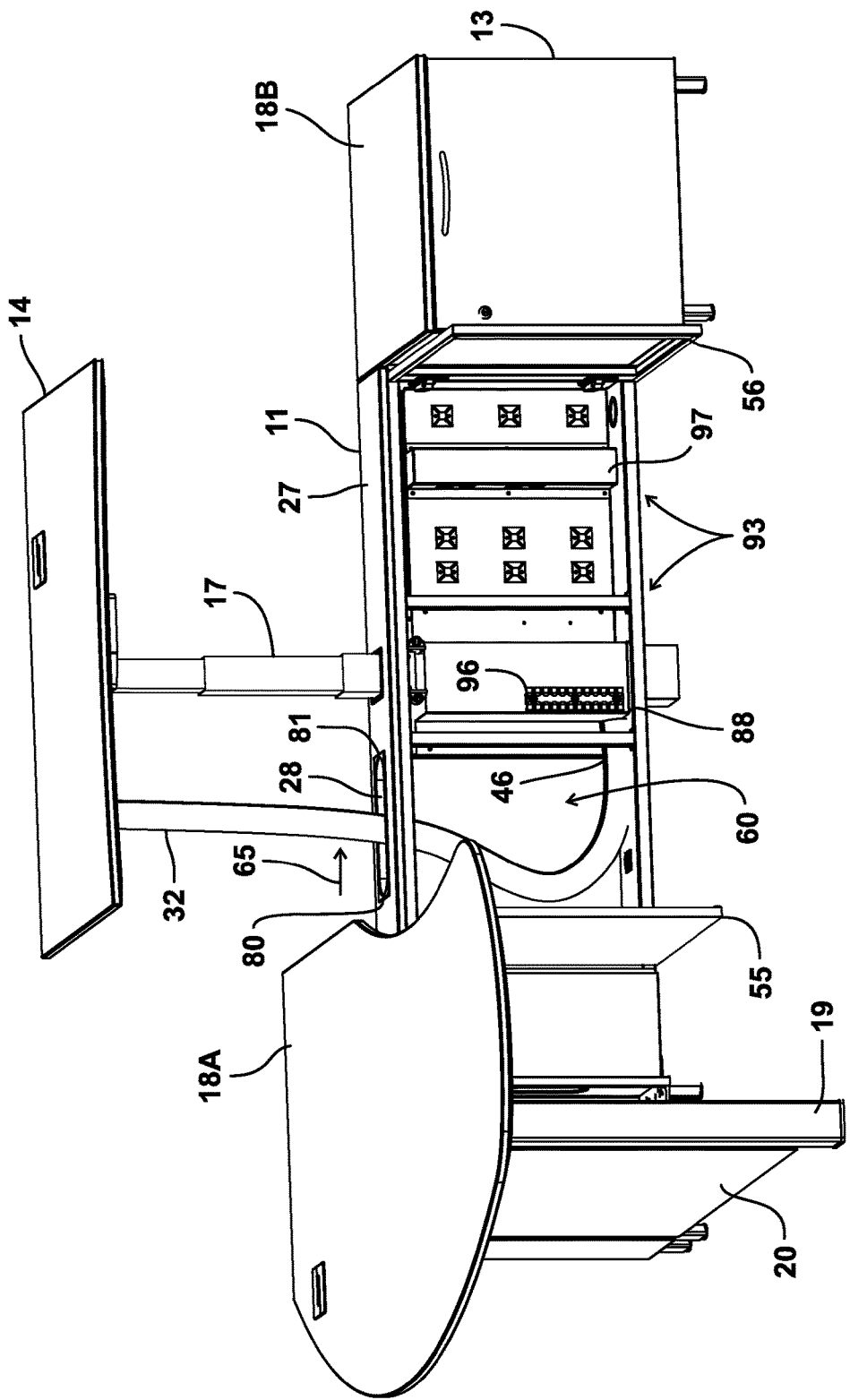
FIG. 10 is a perspective view of a preferred embodiment of the apparatus of the present invention.
Figure 11:
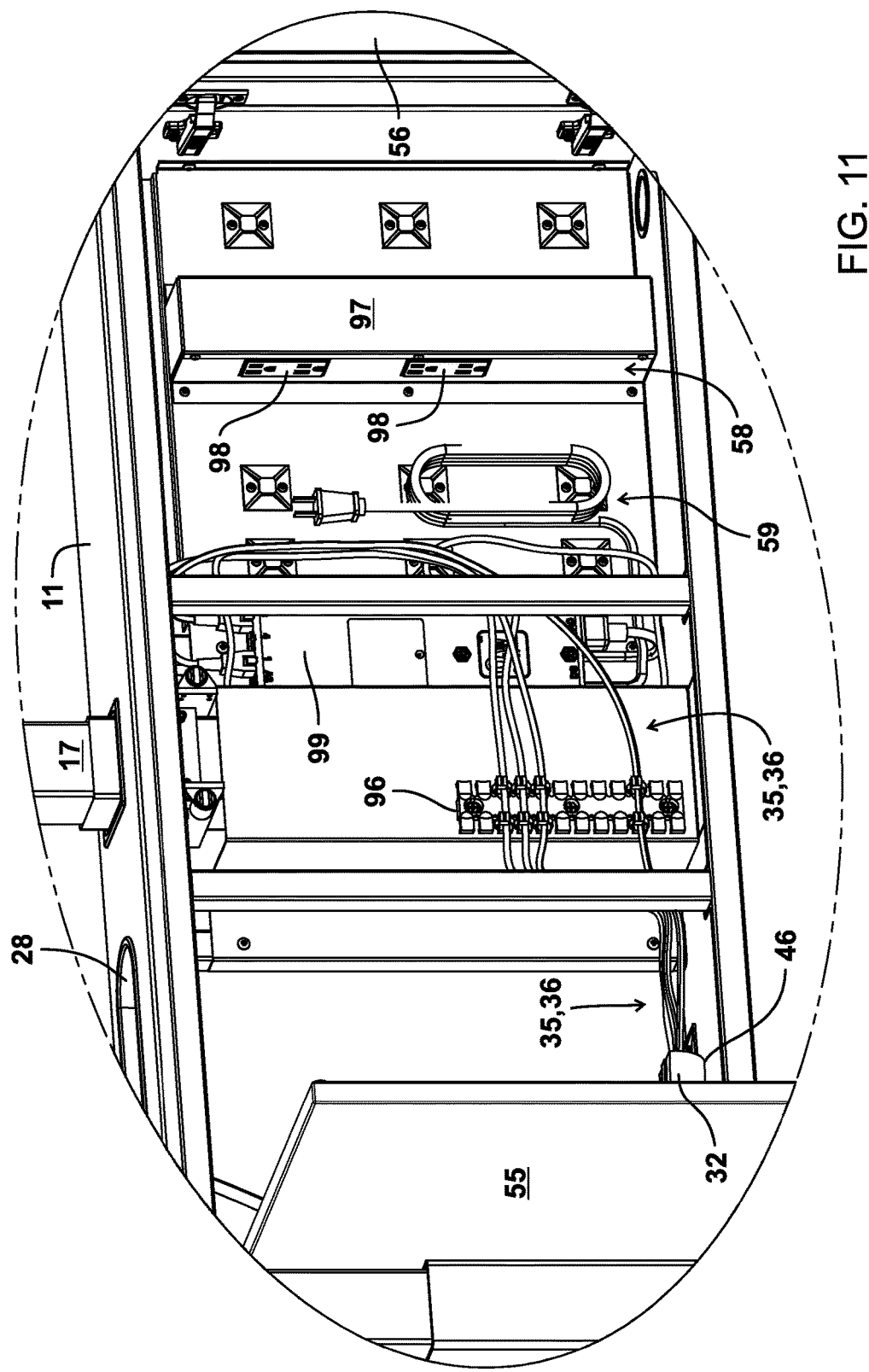
FIG. 11 is a fragmentary view of a preferred embodiment of the apparatus of the present invention.
Figure 12:
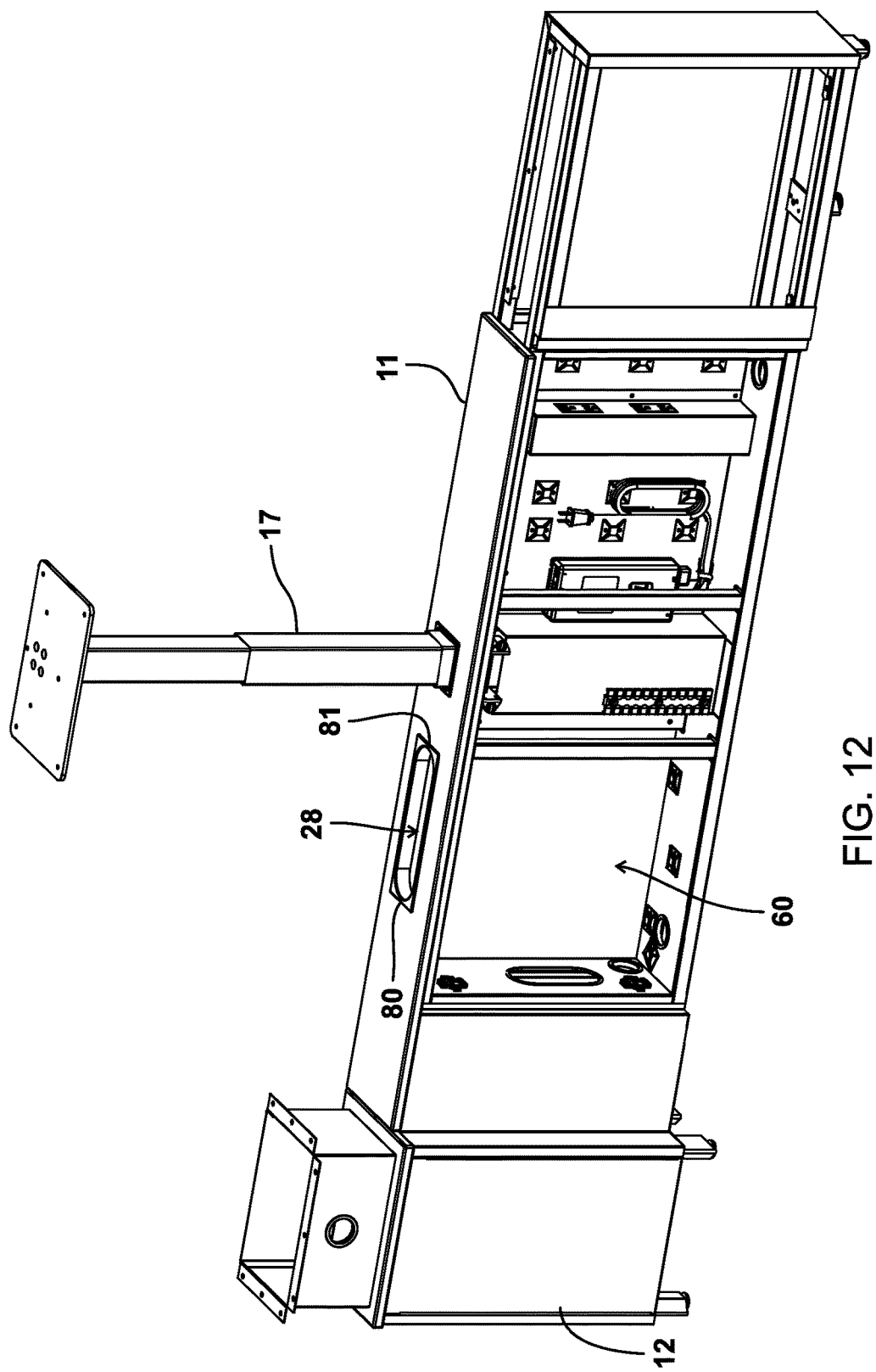
FIG. 12 is a partial perspective view of a preferred embodiment of the apparatus of the present invention.

Middle section/cabinet 11 has a top panel 27 that extends between front edge 29 and rear edge 30. An oval shaped or elongated slot 28 (see FIGS. 1-2, 4, 8, 10-19) provides an opening or aperture that is receptive of cables or cabling that extend from middle cabinet 11 interior 60 through slot 28 to elevating desk top 14. In a preferred embodiment of the present invention, elongated slot 28 is 10 by 2.75 inches. In other embodiments elongated slot 28 can be sized to accommodate cables or cabling within a sleeve 32. As desk top 14 is raised and lowered, any cables or cabling or cable group/assembly 31 (e.g., cable group 31 includes sleeve 32 and the cables 35, 36 contained in sleeve 32) moves laterally in slot 28 as indicated by arrows 65 (see FIGS. 1, 8A, 11, 15 and 29). Notice that the slot 28 for FIGS. 1-14 is the same slot 28 seen in the embodiment of FIG. 15-19 or 32. Slot 28 thus has ends 80, 81. Cable group/assembly 31 can thus move laterally between ends 80, 81 as top 14 is raised or lowered. As desk top 14 is elevated or raised, cable group 31 is preferably pulled to end 80 (see FIG. 31A) because the cable group 31 is in its most straightened position. When desk top 14 is lowered (see FIGS. 31B-31F), cable group/assembly 31 preferably moves toward end 81 as the cable group 31 assumes a curved or "S" shape (see FIG. 31F) in the lowest position of desk top 14). In FIG. 10, middle section or cabinet 11 has various electrical components such as strain relief plate 96 and a power distribution harness inside housing 97. Housing 97 can have receptacles 98. Cables 35, 36 are contained in cabinet 11, routed to sleeve or sock 32. Control box 99 can be used to house controllers for operating support/leg/column 17.

The cable group/assembly 31 includes specially configured sleeve 32 (see FIGS. 21-30), which can contain multiple cables such as power cables 35 and data cables 36. In various embodiments, cable group or assembly 31 employs a sleeve 32 having a dividing panel 84 that separates two bores, lumens or cavities or compartments 86, 87. These compartments include a first cavity, compartment or bore 86 that can contain one or more power cables 35 and a second cavity, compartment or bore 87 that can contain one or more data cables 36. Panel 84 can thus separate power cables 35 from data cables 36 (see FIG. 23).

Sleeve 32 preferably includes flaps 38, 39, 40, 41. The flaps 38, 39 can be connected together with provided fasteners 42, 43 to form compartment/cavity/bore 87 with dividing wall or panel 84. Similarly, flaps 40, 41 can be connected together with provided hook and loop portions 44, 45 (see FIG. 27). Sleeve 32 has lower end 46 and upper end 47 (see FIGS. 29-31F).

In FIGS. 13-14, elevating desk apparatus 10 provides a right side cabinet 66 that preferably extends away from middle section 11 a greater distance (i.e. has a greater depth (arrow 79)) than the right side section or cabinet 13 depth (arrow 26) of FIGS. 1-7. In FIGS. 13-14, a left side cabinet or section 67 is coupled to desk or table top 68. Leg 69 also supports table top 68. Left side cabinet or section 67 can have a leg or support 70 coupled to desk or table top 68. Support/leg 69 in FIGS. 13-14 is preferably a fixed and not elevating leg/support.

Figure 15:
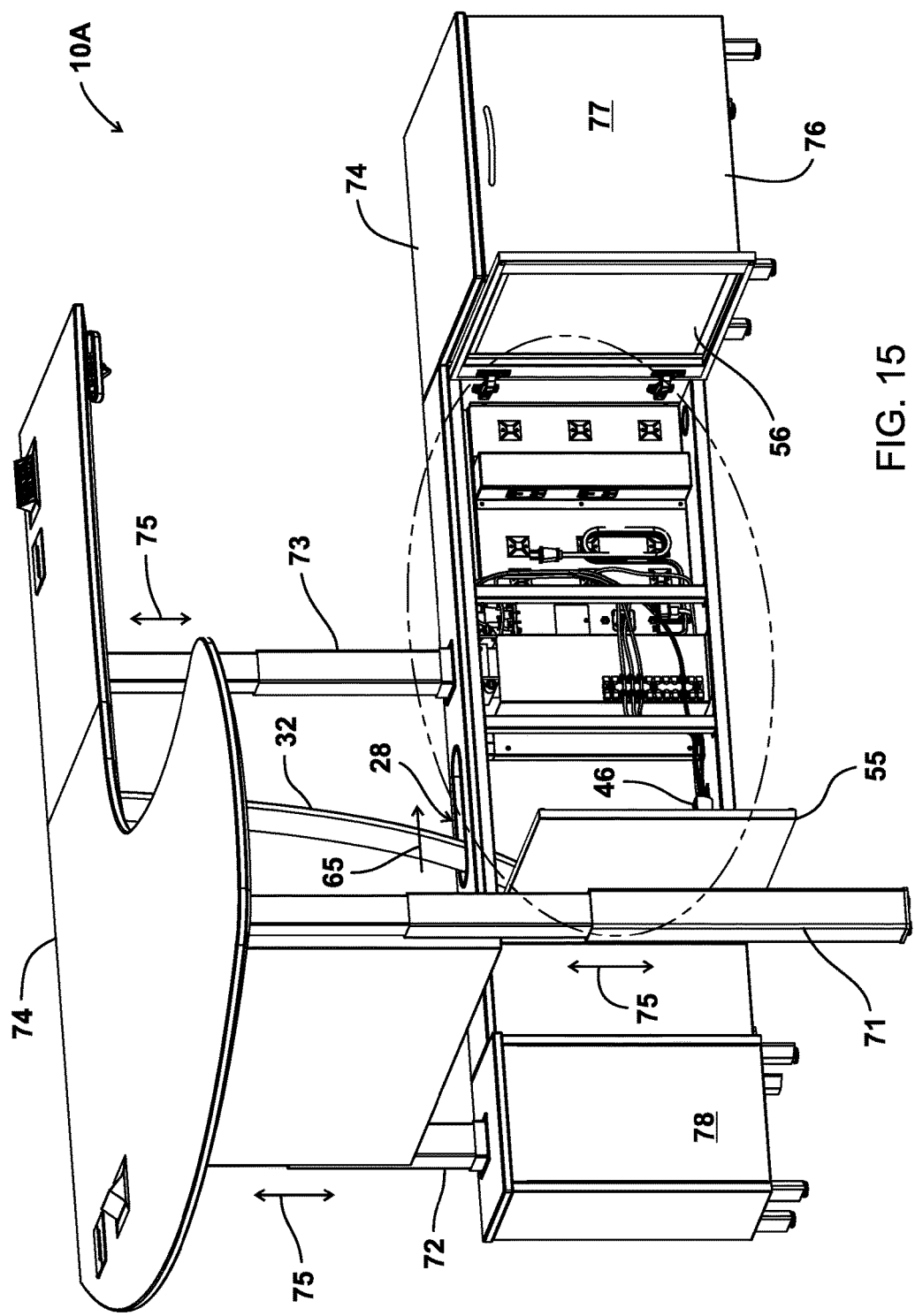
FIG. 15 is a perspective view of a second embodiment of the apparatus of the present invention.
Figure 16:
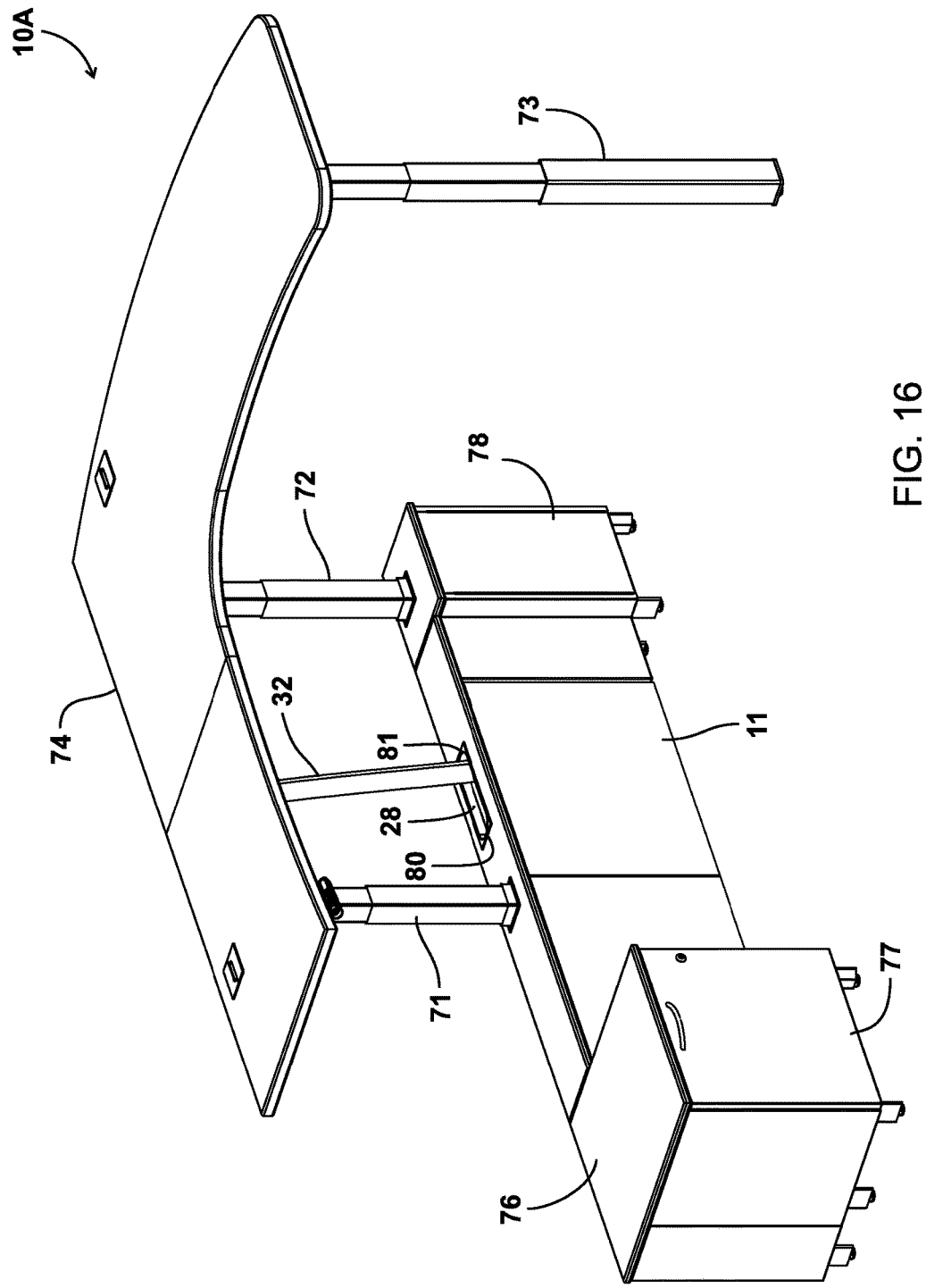
FIG. 16 is a partial perspective view of a second embodiment of the apparatus of the present invention.
Figure 17:
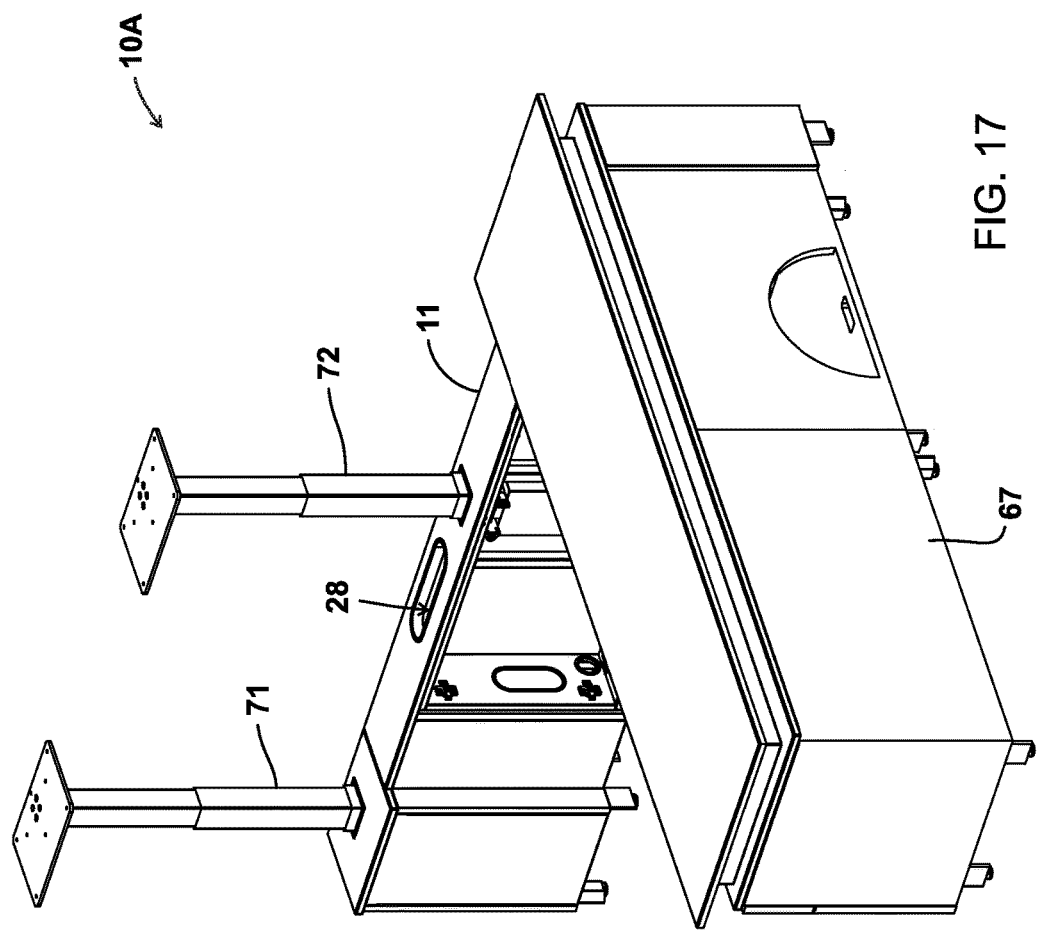
FIG. 17 is a fragmentary view of a second embodiment of the apparatus of the present invention.

FIGS. 15-17 show an additional preferred embodiment of an elevating desk apparatus, designated generally by the numeral 10A. In FIGS. 15-17, a plurality of legs 71, 72, 73 support desk top 74. Each of the legs 71, 72, 73 can be telescoping legs as indicated by arrows 75 in FIG. 15. Telescoping leg 73 is mounted to middle cabinet or section 11. Telescoping leg 72 is mounted to left side section or cabinet 78. Telescoping leg 71 extends from desk top 74 to an underlying support surface such as a floor. Right side cabinet or section 76 preferably attaches to the right side of the middle or central cabinet or section 11. Right side cabinet or section 76 can have a storage cabinet 77. In FIG. 16, the configuration is reversed (as compared to FIG. 15) wherein cabinet 76' is a left hand cabinet or section and cabinet 78' is a right hand cabinet or section. Desk top 74 can thus provide a left hand return in FIG. 15 and a right hand return in FIG. 16.

In all embodiments of FIGS. 1-17, middle cabinet or section 11 can house various electrical components including powerstrip/electrical supply 58, underside cable receptacle or cable mount or cable holder 59, power cables 35, data cables 36 and any other selected electrical component needed for the function of a computer telephone, laptop, tablet (e.g., an android tablet or an IPad® device), mobile phone, docking station or the like. Middle section or cabinet 11 can have panels or doors 55, 56 wherein the sleeve 32, power strip/electrical supply 58, underside cable receptacle or cable mount or cable holder 59, power cables 35, and data cables 36 can be accessed.

Figure 18:
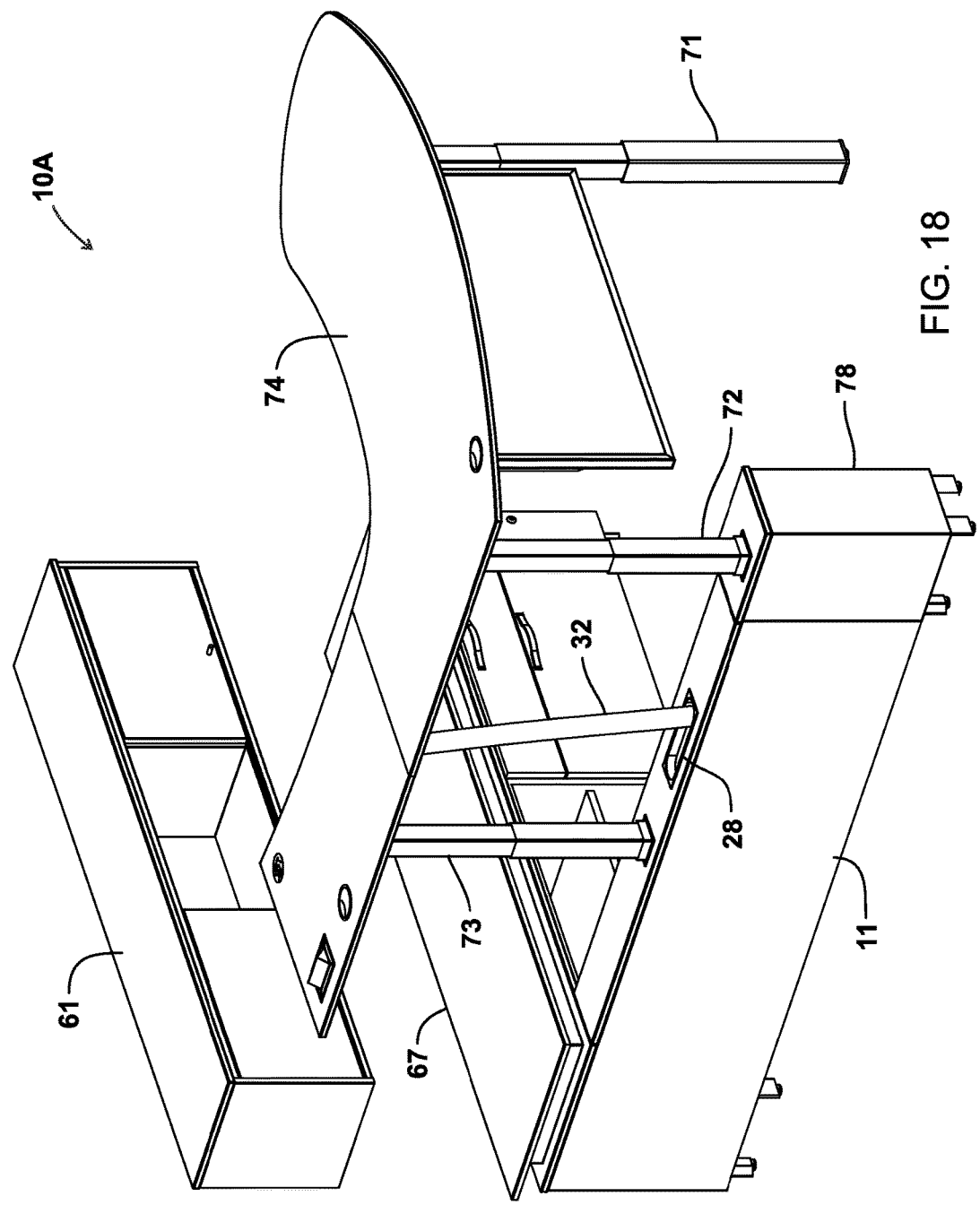
FIG. 18 is a fragmentary view of a second embodiment of the apparatus of the present invention.
Figure 19:
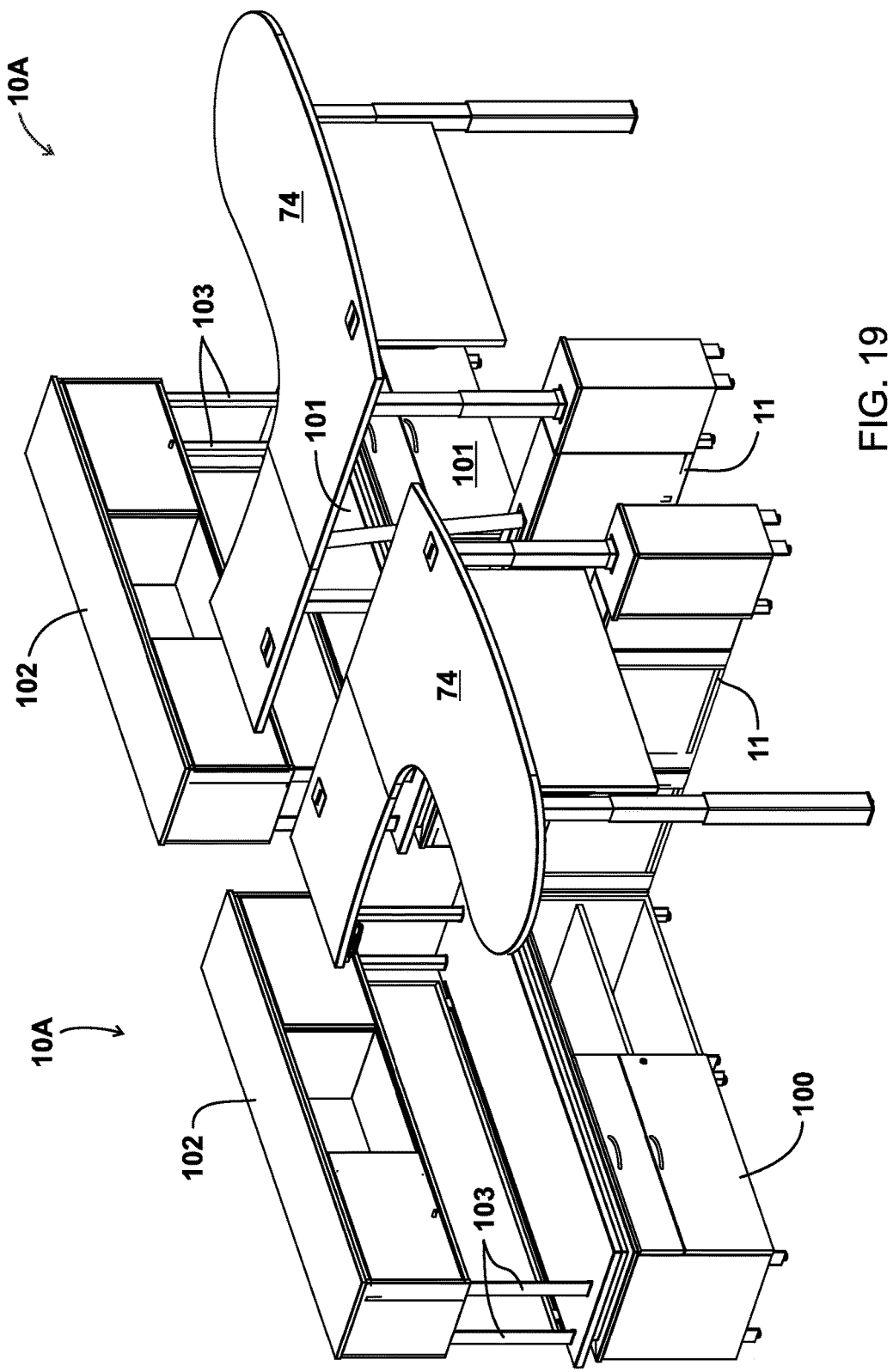
FIG. 19 is a perspective view of a second embodiment of the apparatus of the present invention.

FIG. 18 shows the elevating desk apparatus 10A of FIG. 15 with wall storage unit 61 and an elongated left side cabinet 67. In FIG. 19, multiple elevating desk apparatuses 10A are provided, one having a left side cabinet or return cabinet 100 fitted with storage unit 102 on legs 103. The other apparatus 10A has a right side cabinet or return cabinet 101. Both of the apparatuses 10A in FIG. 19 have the middle cabinet 11 and table top or desk top or panel 74.

Figure 23:
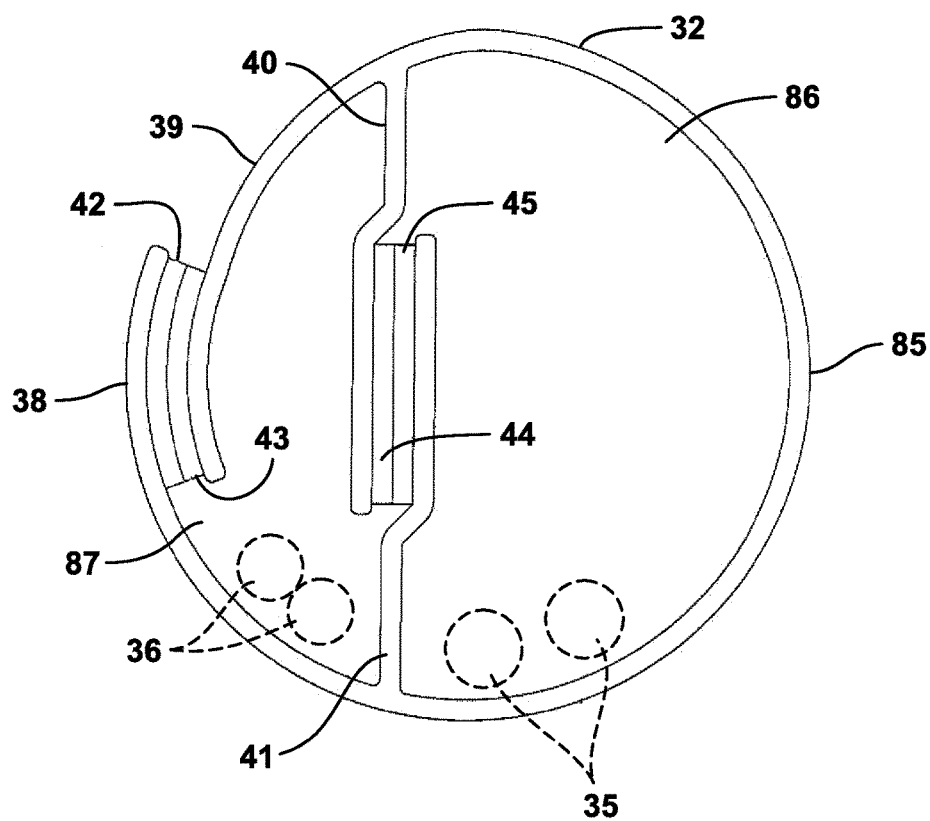
Figure 24:
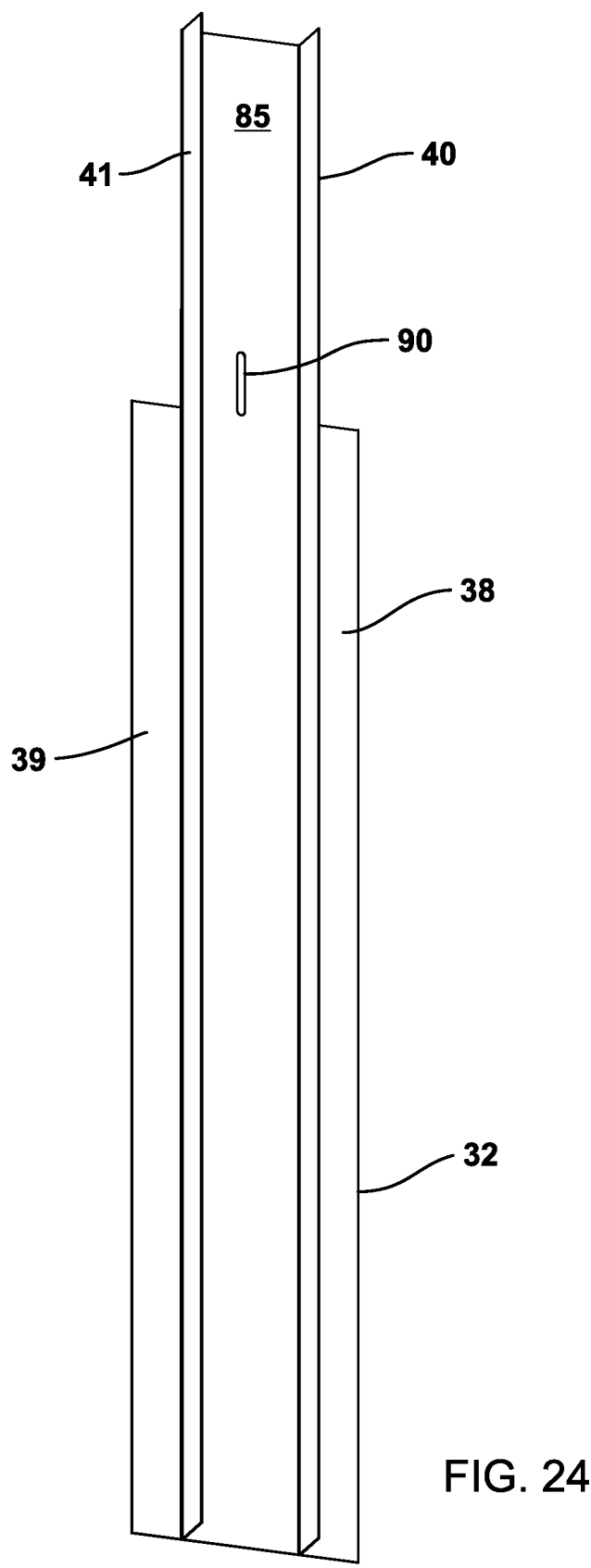
Figure 26:
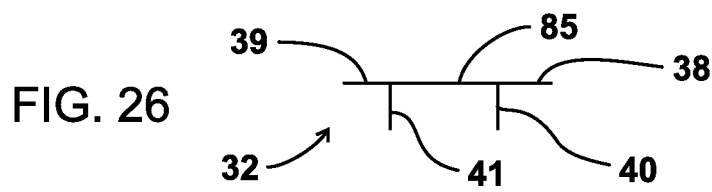
Figure 25:
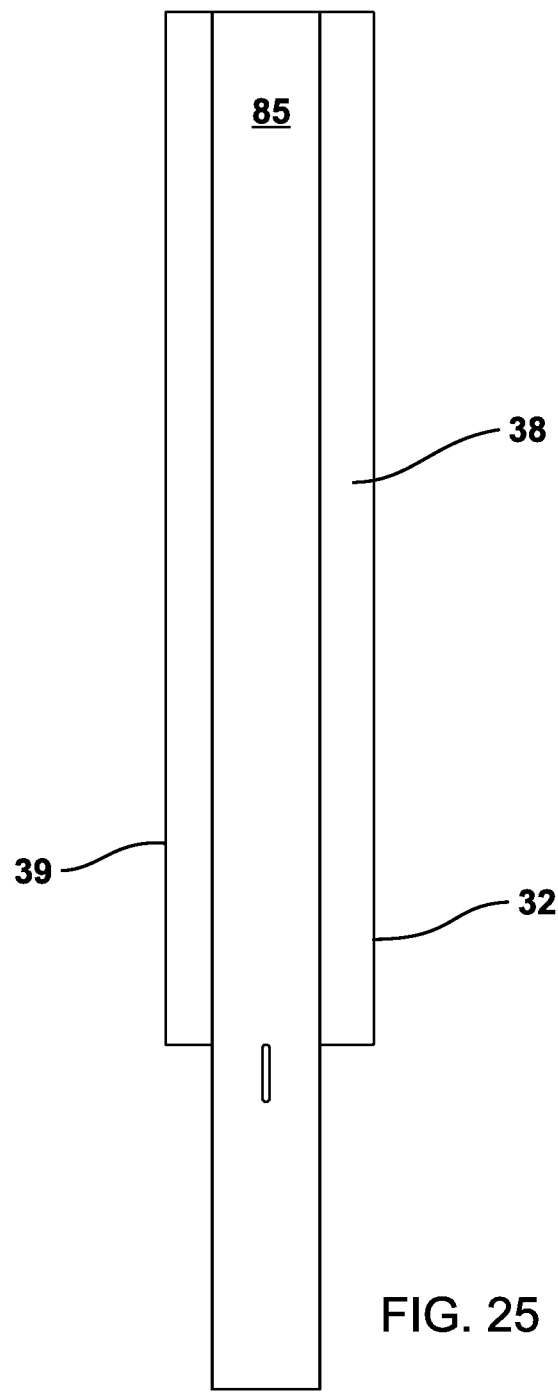
Figure 27:
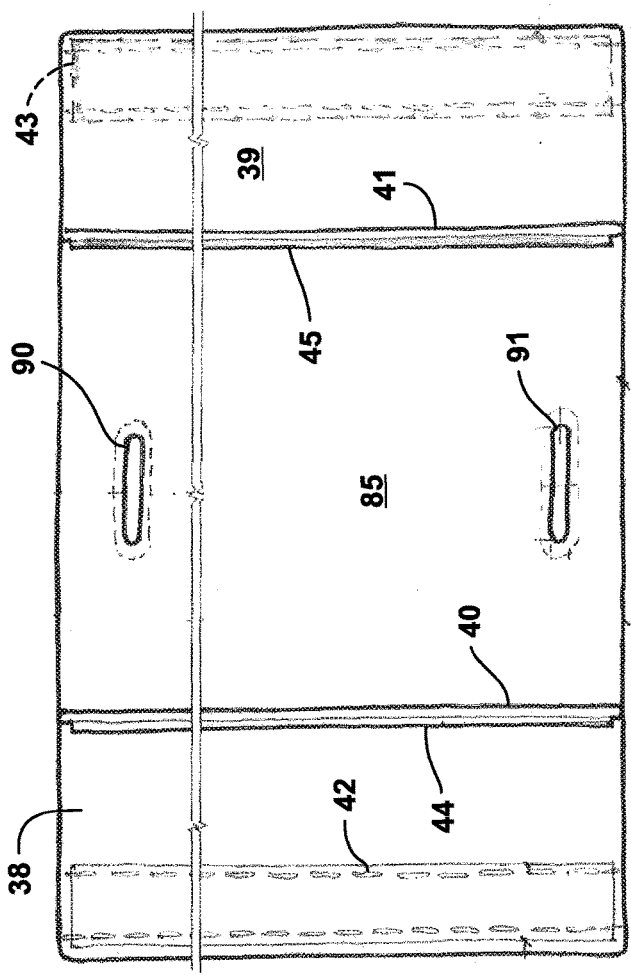
Figure 28:
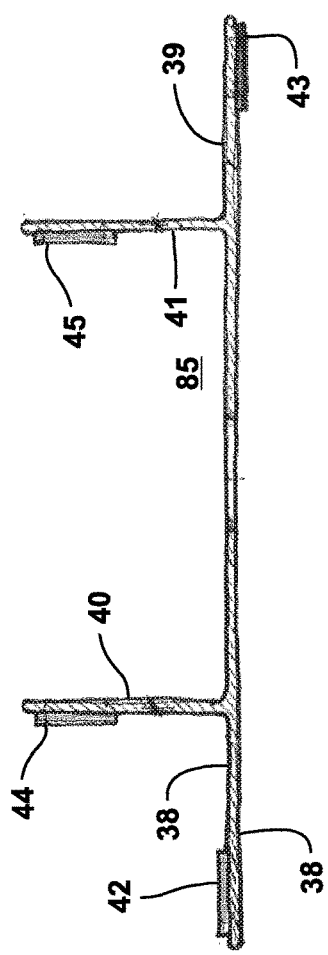
Figure 29:
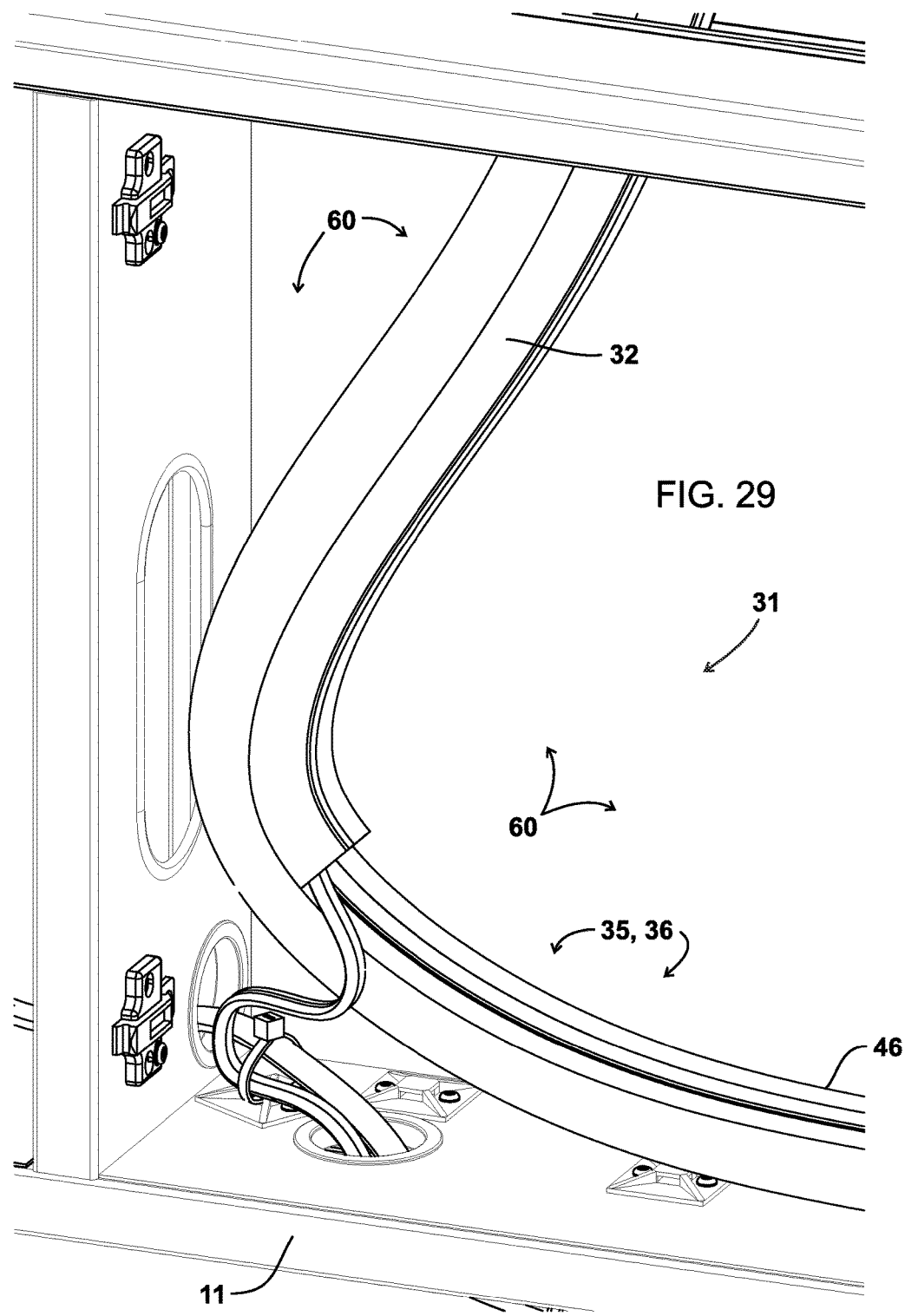
Figure 30:
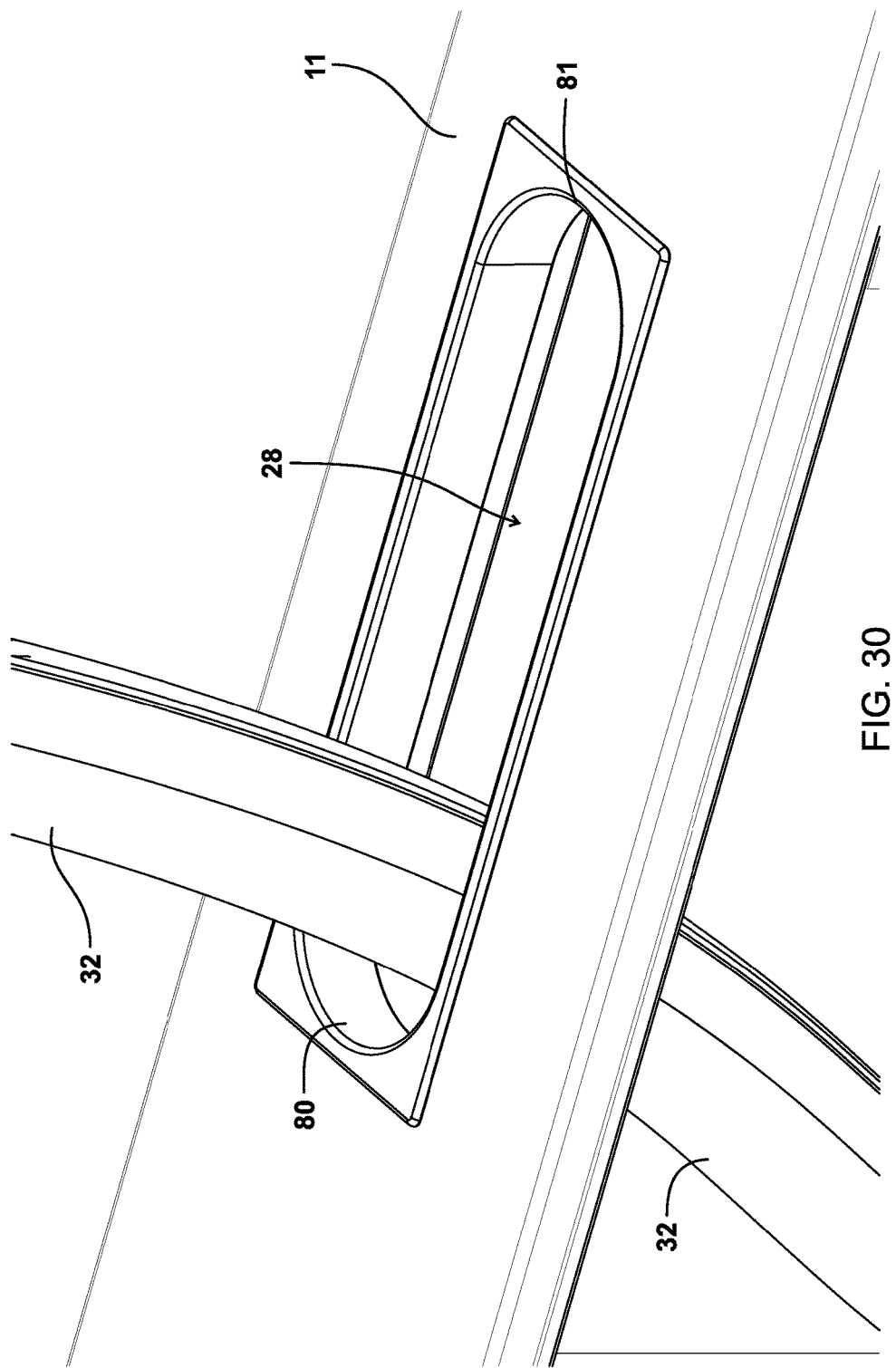

FIGS. 20-31 show sleeve 32 in more detail. Sleeve 32 can be formed of a flat part 85 that includes flaps 38-39. Flaps 40, 41 are affixed to flat part 85 as seen in FIG. 24. The flaps 38, 40 have hook portions 42, 44 (e.g., Velcro hook portions). The flaps 39, 41 have loop portions 43, 45 (e.g., Velcro loop portions). In FIG. 23, the cross section of sleeve 32 is in operating position wherein flaps 40, 41 are connected together at hook and loop portions 44, 45.

The flaps 40, 41 are preferably connected together at hook and loop portions 44, 45 to form dividing wall 84 (see FIGS. 21, 23). Two bores 86, 87 are provided. Bore 86 can carry one or more power cords 35. Bore 87 can carry one or more data cables/cords 36. Grommets, slots or openings 90, 91 can be provided in flat part 85. These slots, grommets or openings 90, 91 enable a selected cable 35 or 36 to exit a selected bore 86 or 87. The sleeve 32 thus separates power cables or cords 35 from data cables or cords 36. The sleeve 32 has end portions 46, 47, each end portion having one or more anchors 88, 89. Anchors 88 can be located at lower end portion 46 of sleeve 32 and enable attachment of the lower end 46 of the sleeve 32 to middle cabinet 11 interior 60. Anchors 89 can also be located at the upper end portion 47 of sleeve 32 and enable attachment of the upper end 47 of the sleeve 32 to desk top or section 14 (e.g., using plates 104 and fasteners such as screws) (see FIGS. 9-9B). Anchors 88 on lower end portion 46 can comprise the same or similar configuration as anchors 89 located on upper end portion 47. One or more longitudinally extending grommets, slots or openings 90, 91 is preferably provided in flat part 85. Flat part 85 and flaps 40, 41 can be longer than flaps 38, 39 (see FIG. 26).

Figure 32:
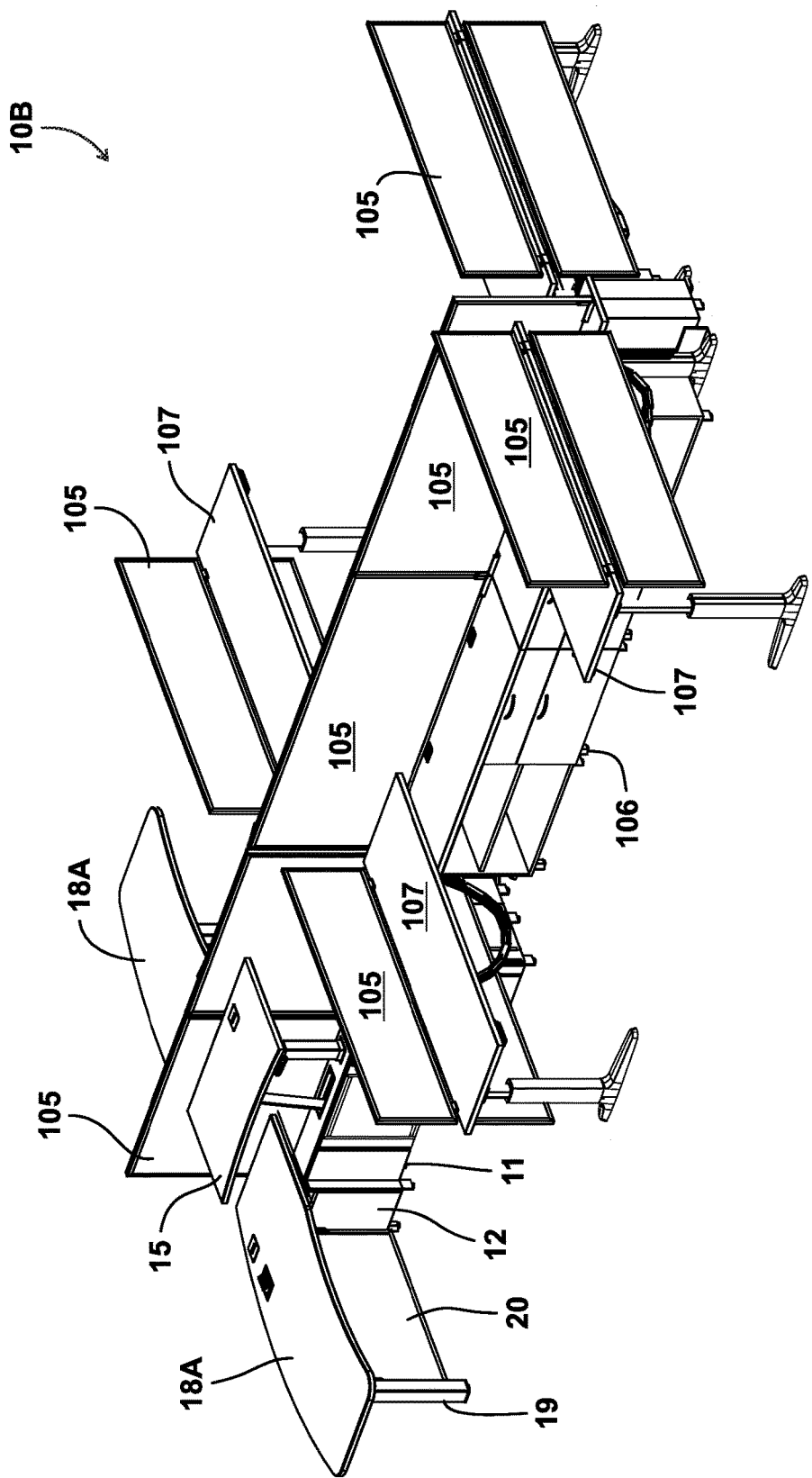
FIG. 32 is a perspective view of a third embodiment of the apparatus of the present invention.

In FIG. 32, the apparatus 10 or 10A can be used as part of a group 10B that includes dividing privacy walls or acoustic panels 105, storage units 106 and tables 107. The length, width, and height of an elevating desk apparatus 10, 10A or 10B can vary. In a preferred embodiment, an elevating desk apparatus 10 comprises a length of about 9 feet a width of about 6 feet, and a height of about 3 feet. In one embodiment of the present invention, the elevating desk apparatus 10 is preferably made out of steel and wood. Other suitable materials include other metals, plastic or synthetic materials. The length, width, and height of the middle section cabinet 11 can vary. In a preferred embodiment a middle section cabinet 11 has a length of about 6 feet, a width of about a ½ foot, and a height of about 2 feet. The middle section cabinet 11 is preferably made out of steel. Other suitable materials include other metals, plastic or synthetic materials.

The length, width, and height of the left side section cabinet 12 can vary. One embodiment of the present invention has a left side section cabinet 12 with dimensions of about 1 foot as the length, about 1 foot as the width, and about 2 feet as the height. In one embodiment of the present invention, the left side section cabinet 12 is preferably made out of steel. Other suitable materials include other metals, plastic or synthetic materials.

The length, width, and height of the right side section cabinet 13 can vary. In a preferred embodiment, a right side section cabinet 13 has a length of about 2 feet, a width of about 1 foot, and a height of about 2 feet. Preferably, right side section cabinet 13 is made out of steel. Other suitable materials include other metals, plastic or synthetic materials.

The length, width, and height of a telescoping support or leg 17 can vary. Preferably it is 2.75 square inches. In one embodiment of the present invention, telescoping support or leg 17 is preferably made out of steel. Telescoping support or leg 17 can also comprise other metal, plastic or synthetic materials.

The following is a list of parts and materials suitable for use in the present invention.

| PARTS LIST | |
|---|---|
| Part Number | Description |
| 10 | elevating desk apparatus |
| 10A | elevating desk apparatus |
| 10B | elevating desk apparatus |
| 11 | middle section/central section/cabinet |
| 12 | left side section/left side cabinet |
| 13 | right side section/right side cabinet |
| 14 | elevating desk top/desk section |
| 15 | work surface/upper surface |
| 16 | underside/lower surface |
| 17 | telescoping support/extensible leg/column |
| 18A | fixed desk top |
| 18B | fixed desk top |
| 19 | support/leg |
| 20 | panel/fixed panel |
| 21 | height arrow |
| 22 | depth arrow |
| 23 | height arrow |
| 24 | depth arrow |
| 25 | height arrow |
| 26 | depth arrow |
| 27 | middle section top panel |
| 28 | oval shaped slot/elongated slot/elongated opening |
| 29 | front edge |
| 30 | rear edge |
| 31 | cable group/assembly |
| 32 | sleeve/sock |
| 35 | power cable/power cord |
| 36 | data cable/data cord |
| 38 | flap |
| 39 | flap |
| 40 | flap |
| 41 | flap |
| 42 | fastener/hook portion |
| 43 | fastener/loop portion |
| 44 | fastener/hook portion |
| 45 | fastener/loop portion |
| 46 | lower end/first end |
| 47 | upper end/second end |
| 55 | panel/door |
| 56 | panel/door |
| 58 | power strip/electrical supply |
| 59 | underside cable receptacle/cable mount/cable holder |
| 60 | cabinet interior |
| 61 | storage unit |
| 64 | depth arrow |
| 65 | arrow |
| 66 | right side section/cabinet |
| 67 | left side section/cabinet |
| 68 | table/desk top |
| 69 | support/leg |
| 70 | support/leg |
| 71 | leg/telescoping leg |
| 72 | leg/telescoping leg |
| 73 | leg/telescoping leg |
| 74 | desk top/table top/panel |
| 75 | arrow |
| 76 | right side cabinet/section |
| 76' | left side cabinet/section |
| 77 | storage unit |
| 78 | left side cabinet/section |
| 78' | right side cabinet/section |
| 79 | arrow |
| 80 | slot end |
| 81 | slot end |
| 84 | dividing wall/panel |
| 85 | flat part |
| 86 | bore/first compartment/cavity |
| 87 | bore/second compartment/cavity |
| 88 | anchor |
| 89 | anchor |
| 90 | grommet/slot/opening |
| 91 | grommet/slot/opening |
| 92 | grommet/slot/opening |
| 93 | knee space area |
| 94 | release handle |
| 95 | release cable |
| 96 | strain relief plate |
| 97 | power distribution harness housing |
| 98 | receptacles |
| 99 | control box |
| 100 | left side cabinet/left side return |
| 101 | right side cabinet/right side return |
| 102 | storage unit |
| 103 | leg |
| 104 | plate |
| 105 | wall/acoustic panel |
| 106 | storage unit |
| 107 | tables |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An elevating desk apparatus comprising:
   a) a base that includes a middle cabinet having a cabinet interior, left and right side portions and a middle cabinet top with an upper surface;
   b) a telescoping member supported by the base;
   c) a right side cabinet section attached to the right side portion of the middle cabinet;
   d) a left side cabinet section attached to the left side portion of the middle cabinet;
   e) a movable desk top having a work surface, the movable desk top mounted on said telescoping member and movable between upper and lower positions;
   f) an elongated slot or opening in the base at said middle cabinet top, said slot having first and second slot end portions;
   g) a cable assembly that extends between the middle cabinet interior and the movable desk top;
   h) wherein the cable assembly moves laterally between the slot end portions when the movable desk top moves between said upper and lower positions;
   i) wherein the cable assembly includes multiple cables contained within a cable sleeve;
   j) wherein the sleeve has two bores separated by a dividing panel or wall; and
   k) wherein the sleeve includes two pairs of connectable flaps, wherein each pair of flaps can be opened and closed to form a said bore.

2. The elevating desk apparatus of claim 1 wherein the cable assembly includes a power cable or cables and a data cable or cables.

3. The elevating desk apparatus of claim 2 wherein the power cable or cables occupies one said bore and the data cable or cables occupies the other said bore.

4. The elevating desk apparatus of claim 1 wherein the sleeve includes knitted material.

5. The elevating desk apparatus of claim 1 wherein the sleeve includes flexible material.

6. The elevating desk apparatus of claim 1 wherein the sleeve includes fabric material.

7. The elevating desk apparatus of claim 1 wherein one pair of flaps extends a first distance and the other pair of flaps extends a second distance that is longer than said first distance.

8. The elevating desk apparatus of claim 1 further comprising fasteners that enable the flaps to be closed and opened.

9. An elevating desk apparatus comprising:
   a) a base that includes a middle cabinet having a middle cabinet interior, left and right side portions and a middle cabinet top with an upper surface;
   b) a telescoping member supported by the base;
   c) a right side cabinet section attached to the right side portion of the middle cabinet;
   d) a left side cabinet section attached to the left side portion of the middle cabinet;
   e) a movable desk top having a work surface, the movable desk top mounted on said telescoping member to move between upper and lower positions;
   f) a slot or opening in the base at said middle cabinet top and having end portions;
   g) a cable assembly that extends between the cabinet interior and the movable desk top, the cable assembly including a flexible sleeve having two longitudinally extending bores;
   h) wherein the cable assembly moves laterally between the slot end portions when the movable desk top moves between said upper and lower positions;
   i) one or more power cables in one said sleeve bore;
   j) one or more data cables in the other said sleeve bore;
   k) wherein the cable sleeve is in an elongated position when the desk top moves to said upper position and the cable sleeve is in a curved position when the desk top is lowered to said lower position wherein a majority of the sleeve is stored in the middle cabinet interior;
   l) wherein the cable assembly includes multiple cables contained within a cable sleeve; and
   m) wherein the sleeve has two bores separated by a dividing panel and the sleeve includes two pairs of connectable flaps, wherein each pair of flaps can be opened and closed to form a said bore.

10. The elevating desk apparatus of claim 9 wherein one pair of flaps extends a first distance and the other pair of flaps extends a second distance that is longer than said first distance.

11. The elevating desk apparatus of claim 9 further comprising fasteners that enable the flaps to be closed and opened.

12. An elevating desk apparatus comprising:
   a) a base that includes a middle cabinet having a cabinet interior, left and right side portions and a middle cabinet top with an upper surface;
   b) a telescoping member supported by the base;
   c) a right side cabinet section attached to the right side portion of the middle cabinet;
   d) a left side cabinet section attached to the left side portion of the middle cabinet;
   e) a movable desk top having a work surface, the movable desk top mounted on said telescoping member and movable between upper and lower positions;
   f) an elongated slot or opening in the base at said middle cabinet top, said slot having first and second slot end portions;
   g) a cable assembly that extends between the middle cabinet interior and the movable desk top;
   h) wherein the cable assembly moves laterally between the slot end portions when the movable desk top moves between said upper and lower positions;
   i) wherein the cable assembly includes multiple cables contained within the cable sleeve;
   j) wherein the cable sleeve has two bores separated by a dividing panel or wall; and
   k) wherein the cable sleeve includes a pair of connectable flaps that can be opened and closed to form one of said bores.

13. The elevating desk apparatus of claim 12 wherein the multiple cables of the cable assembly include a power cable or cables that occupies one said bore and a data cable or cables that occupies the other said bore.

14. The elevating desk apparatus of claim 12 wherein the cable sleeve includes knitted material.

* * * * *